US012148391B2

(12) United States Patent
Choi et al.

(10) Patent No.: US 12,148,391 B2
(45) Date of Patent: Nov. 19, 2024

(54) SCAN DRIVER INCLUDING PLURALITY OF FIRST STAGES AND PLURALITY OF SECOND STAGES FOR OUTPUTTING PLURALITY OF SCAN SIGNALS

(71) Applicant: Samsung Display Co., Ltd., Yongin-Si (KR)

(72) Inventors: Yanghwa Choi, Yongin-si (KR); Junghwan Hwang, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/103,260

(22) Filed: Jan. 30, 2023

(65) Prior Publication Data

US 2023/0186859 A1 Jun. 15, 2023

Related U.S. Application Data

(63) Continuation of application No. 17/377,293, filed on Jul. 15, 2021, now Pat. No. 11,568,822.

(30) Foreign Application Priority Data

Dec. 15, 2020 (KR) ........................ 10-2020-0175830

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0809* (2013.01); *G09G 2310/061* (2013.01); *G09G 2310/08* (2013.01); *G09G 2330/021* (2013.01)

(58) Field of Classification Search
CPC .................................................... G09G 3/3266
USPC .......................................................... 345/211
See application file for complete search history.

(56) References Cited

U.S. PATENT DOCUMENTS 10,891,903 B2 1/2021 Takasugi
2010/0079361 A1* 4/2010 Lee ...................... G09G 3/3233 345/77
2013/0100007 A1 4/2013 Yamamoto et al.
2016/0240145 A1* 8/2016 Jeong ......................... G06F 1/04
2018/0151121 A1 5/2018 Lim et al.
2018/0350300 A1* 12/2018 Park ..................... G09G 3/3266
2019/0164498 A1 5/2019 Jang
(Continued)

FOREIGN PATENT DOCUMENTS

CN 100422829 C 10/2018
KR 10-1282222 B1 7/2013
(Continued)

*Primary Examiner* — Long D Pham
(74) *Attorney, Agent, or Firm* — Innovation Counsel LLP

(57) ABSTRACT

An embodiment of a display apparatus includes a scan driver, a pixel, a first scan line electrically connecting the scan driver to the pixel, a second scan line electrically connecting the scan driver to the pixel, and a third scan line electrically connecting the scan driver to the pixel, wherein in operation: the pixel receives first, second, and third scan signals from the scan driver by way of the first, second, and third scan lines, respectively; the first and second scan signals produce a display period of a frame period in the pixel; and the third scan signal produces a black insertion period of the frame period in the pixel.

21 Claims, 16 Drawing Sheets

(56) References Cited

U.S. PATENT DOCUMENTS

| | | | |
|---|---|---|---|
| 2019/0189060 A1 | 6/2019 | Takasugi | |
| 2020/0219451 A1 | 7/2020 | Kim | |
| 2021/0065630 A1 | 3/2021 | Feng et al. | |
| 2021/0193021 A1* | 6/2021 | Yang | G09G 3/3266 |

FOREIGN PATENT DOCUMENTS

| | | | |
|---|---|---|---|
| KR | 10-1598815 | B1 | 3/2016 |
| KR | 10-2018-0127896 | A | 11/2018 |
| KR | 10-2020-0077929 | A | 7/2020 |
| WO | 2020024985 | A1 | 2/2020 |

* cited by examiner

SCAN DRIVER INCLUDING PLURALITY OF FIRST STAGES AND PLURALITY OF SECOND STAGES FOR OUTPUTTING PLURALITY OF SCAN SIGNALS

CROSS-REFERENCE TO RELATED APPLICATION

This application is a continuation of U.S. patent application Ser. No. 17/377,293, filed on Jul. 15, 2021, now U.S. Pat. No. 11,568,822, which claims priority under 35 U.S.C. § 119 to Korean Patent Application No. 10-2020-0175830, filed on Dec. 15, 2020, in the Korean Intellectual Property Office, the disclosures of which are incorporated herein by reference in their entireties.

BACKGROUND

1. Field

The present disclosure relates to a scan driver and a display apparatus including the same.

2. Description of the Related Art

A display apparatus includes a pixel unit including a plurality of pixels, a scan driver, a data driver, a controller, and the like. The scan driver includes stages connected to scan lines, and the stages supply scan signals to the scan lines connected thereto in response to signals from the controller.

SUMMARY

According to one or more embodiments, a display apparatus includes a scan driver, a pixel, a first scan line electrically connecting the scan driver to the pixel, a second scan line electrically connecting the scan driver to the pixel, and a third scan line electrically connecting the scan driver to the pixel, wherein in operation: the pixel receives first, second, and third scan signals from the scan driver by way of the first, second, and third scan lines, respectively; the first and second scan signals produce a display period of a frame period in the pixel; and the third scan signal produces a black insertion period of the frame period in the pixel.

The scan driver may include first and second stages. In operation, the first stage may generate the first and second scan signals, and the second stage may generate the third scan signal. In operation, a duration of each of the first and second scan signals may be two horizontal periods, and the duration of the third scan signal may be a multiple of the horizontal period of at least two of the horizontal periods.

The scan driver comprises a plurality of first stages starting by a first start signal, each of the plurality of first stages outputting the first scan signal and the second scan signal respectively to the first scan line and the second scan line; and a plurality of second stages starting by a second start signal, each of the plurality of second stages outputting the third scan signal to the third scan line. And first scan signals from the plurality of first stages are sequentially output by being shifted by one horizontal period (H), second scan signals from the plurality of first stages are sequentially output by being shifted by one horizontal period (H), and third scan signals from the plurality of second stages are sequentially output by being shifted by bH, where b is a multiple of 2.

The first stage may include a first node controller connected between an input terminal of a first voltage and an input terminal of a second voltage lower than the first voltage and controlling a voltage of a first control node and a voltage of a second control node based on a previous first carry signal and a control signal, a first output controller outputting a first control clock signal as the first scan signal based on the voltage of the first control node, a second output controller outputting a second control clock signal as the second scan signal based on the voltage of the first control node, and a third output controller outputting a first carry clock signal as a first carry signal based on the voltage of the first control node.

The first node controller may include a pair of first transistors connected between the input terminal of the second voltage and the first control node and including a gate electrode connected to an input terminal of a fifth control signal, a pair of second transistors connected between the input terminal of the second voltage and the first control node and including a gate electrode connected to an input terminal of a next first carry signal, a pair of fourth transistors connected between an input terminal of the previous first carry signal and the first control node and including a gate electrode connected to the input terminal of the previous first carry signal, and a pair of twenty-eighth transistors connected between the input terminal of the first voltage and to an intermediate node between the fourth transistors and including a gate electrode connected to the first control node.

The first output controller may include a sixth transistor connected between a first output node connected to a first output terminal for outputting the first scan signal and an input terminal of the first control clock signal and including a gate electrode connected to the first control node, an eighth transistor connected between the first output node and an input terminal of a fourth voltage lower than the second voltage and including a gate electrode connected to the second control node, and a first capacitor connected between the first control node and the first output node.

The second output controller may include a ninth transistor connected between a second output node connected to a second output terminal for outputting the second scan signal and an input terminal of the second control clock signal and including a gate electrode connected to the first control node, an eleventh transistor connected between the second output node and an input terminal of a fourth voltage lower than the second voltage and including a gate electrode connected to the second control node, and a second capacitor connected between the first control node and the second output node.

The third output controller may include a twelfth transistor connected between a third output node connected to a third output terminal for outputting the first carry signal and an input terminal of the first carry clock signal and including a gate electrode connected to the first control node, a fourteenth transistor connected between the third output node and the input terminal of the second voltage and including a gate electrode connected to the second control node, and a third capacitor connected between the first control node and the third output node.

The first stage may further include a first inverter connected between the first control node and the second control node, inverting the voltage of the first control node, and supplying the inverted voltage to the second control node.

The first inverter may include a pair of third transistors connected between the first control node and the input terminal of the second voltage and including a gate electrode connected to a second control node of a next first stage, a pair of fifth transistors connected between the first control node and the input terminal of the second voltage and including a gate electrode connected to the second control node, a sixteenth transistor connected between an input terminal of a third control signal and an input terminal of a third voltage lower than the second voltage and including a gate electrode connected to the first control node, a seventeenth transistor connected between the input terminal of the third control signal and the input terminal of the third voltage and including a gate electrode connected to the first control node of the next first stage, an eighteenth transistor connected between the input terminal of the third control signal and the second control node, a fifteenth transistor connected between the input terminal of the third control signal and a gate electrode of the eighteenth transistor and including a gate electrode connected to the input terminal of the third control signal, a nineteenth transistor connected between the input terminal of the second voltage and the second control node and including a gate electrode connected to the first control node, and a twentieth transistor connected between the input terminal of the second voltage and the second control node and including a gate electrode connected to an input terminal of the previous first carry signal.

The scan driver may further include a plurality of selection driving circuits, each of the plurality of selection driving circuits connected between the input terminal of the first voltage and the input terminal of the second voltage and transmitting the first voltage to the first control node and transmitting the second voltage to the second control node in response to a second control signal in a sensing period of the frame period.

The pixel may include an organic light emitting diode. In operation, the organic light emitting diode may emit light during the display period and may not emit light during the black insertion period.

The pixel may include a driving transistor, a switching transistor connected between a gate electrode of the driving transistor and a data line and including a gate electrode connected to the first scan line, a first control transistor connected between the driving transistor and a power supply for applying an initialization voltage and including a gate electrode connected to the second scan line, and a second control transistor connected between the gate electrode of the driving transistor and a power supply for applying a voltage corresponding to black data and including a gate electrode connected to the third scan line.

Each of the second stages may include a second node controller connected between an input terminal of a first voltage and an input terminal of a second voltage lower than the first voltage and controlling a voltage of a third control node and a voltage of a fourth control node based on a previous second carry signal and a control signal, a fourth output controller outputting a third control clock signal as the third scan signal based on the voltage of the third control node, and a fifth output controller outputting a second carry clock signal as a second carry signal based on the voltage of the third control node.

The second node controller may include a pair of first transistors connected between the input terminal of the second voltage and the third control node and including a gate electrode connected to an input terminal of a fifth control signal, a pair of second transistors connected between the input terminal of the second voltage and the third control node and including a gate electrode connected to an input terminal of a next second carry signal, a pair of fourth transistors connected between an input terminal of the previous second carry signal and the third control node and including a gate electrode connected to the input terminal of the previous second carry signal, and a pair of twenty-eighth transistors connected between the input terminal of the first voltage and an intermediate node between the fourth transistors and including a gate electrode connected to the third control node.

The fourth output controller may include a sixth transistor connected between a fourth output node connected to a fourth output terminal for outputting the third scan signal and an input terminal of the third control clock signal and including a gate electrode connected to the third control node, an eighth transistor connected between the fourth output node and an input terminal of a fourth voltage lower than the second voltage and including a gate electrode connected to the fourth control node, and a fourth capacitor connected between the third control node and the fourth output node.

The fifth output controller may include a twelfth transistor connected between a fifth output node connected to a fifth output terminal for outputting the second carry signal and an input terminal of the second carry clock signal and including a gate electrode connected to the third control node, a fourteenth transistor connected between the fifth output node and the input terminal of the second voltage and including a gate electrode connected to the fourth control node, and a fifth capacitor connected between the third control node and the fifth output node.

The second stage may further include a second inverter connected between the third control node and the fourth control node and inverting the voltage of the third control node and supplying the inverted voltage to the fourth control node.

The second inverter may include a pair of third transistors connected between the third control node and the input terminal of the second voltage and including a gate electrode connected to a fourth control node of a next second stage, a pair of fifth transistors connected between the third control node and the input terminal of the second voltage and including a gate electrode connected to the fourth control node, a sixteenth transistor connected between an input terminal of a third control signal and an input terminal of a third voltage lower than the second voltage and including a gate electrode connected to the third control node, a seventeenth transistor connected between the input terminal of the third control signal and the input terminal of the third voltage and including a gate electrode connected to a third control node of the next second stage, an eighteenth transistor connected between the input terminal of the third control signal and the fourth control node, a fifteenth transistor connected between the input terminal of the third control signal and a gate electrode of the eighteenth transistor and including a gate electrode connected to the input terminal of the third control signal, a nineteenth transistor connected between the input terminal of the second voltage and the fourth control node and including a gate electrode connected to the third control node, and a twentieth transistor connected between the input terminal of the second voltage and the fourth control node and including a gate electrode connected to an input terminal of the previous second carry signal.

According to one or more embodiments, a scan driver includes a plurality of first stages, each of the first stages starts driving in response to a first start signal and outputs a first scan signal and a second scan signal according to a voltage level of a first control node and a second control node, a plurality of selection driving circuits, each of the selection driving circuits electrically connected to a pair of the first stages and transmits a first voltage and a second voltage lower than the first voltage to the first control node and the second control node, respectively, and a plurality of second stages driving in response to a second start signal and outputs a third scan signal according to the voltage levels of a third control node and a fourth control node, wherein the first stages sequentially output each of the first scan signal and the second scan signal in a frame period, the second stages sequentially output the third scan signal in the frame period, each of the first and second scan signals is sequentially output for a duration of two horizontal periods, and the third scan signal is sequentially output for a multiple of the horizontal periods of at least two of the horizontal periods.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
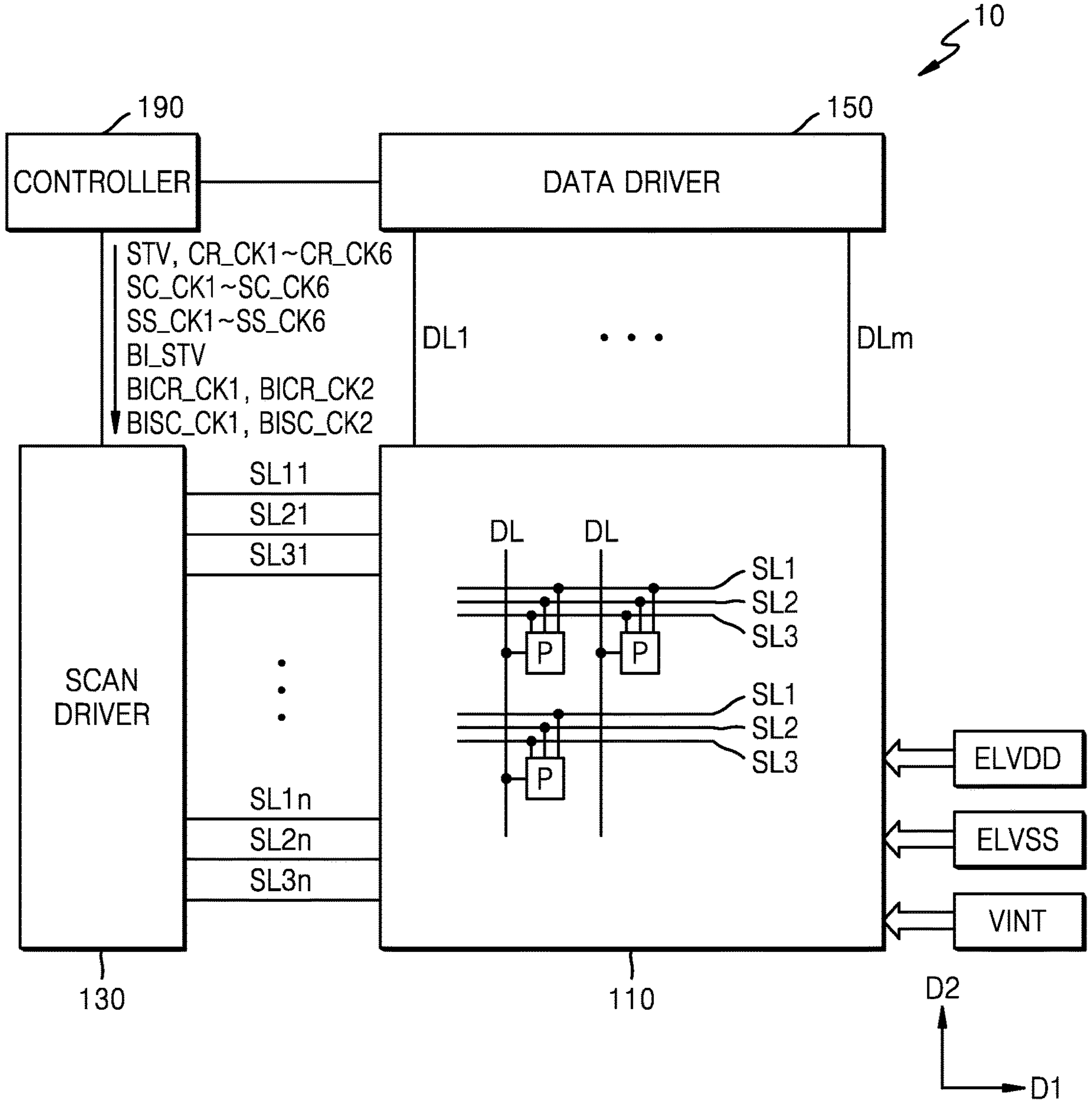
FIG. 1 is a diagram schematically illustrating a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the word "or" means logical "or" so, unless the context indicates otherwise, the expression "A, B, or C" means "A and B and C," "A and B but not C," "A and C but not B," "B and C but not A," "A but not B and not C," "B but not A and not C," and "C but not A and not B."

The disclosure may include various embodiments and modifications, and certain embodiments thereof are illustrated in the drawings and will be described herein in detail. The effects and features of the disclosure and the accomplishing methods thereof will become apparent from the embodiments described below in detail with reference to the accompanying drawings. However, the disclosure is not limited to the embodiments described below and may be embodied in various modes.

It will be understood that although terms such as "first" and "second" may be used herein to describe various elements, these elements should not be limited by these terms and these terms are only used to distinguish one element from another element.

It will be understood that the terms "comprise," "include," and "have" used herein specify the presence of stated features or elements, but do not preclude the presence or addition of one or more other features or elements.

It will be understood that when a layer, region, or element is referred to as being "on" another layer, region, or element, it may be "directly on" the other layer, region, or element or may be "indirectly on" the other layer, region, or element with one or more intervening layers, regions, or elements therebetween.

Sizes of elements in the drawings may be exaggerated for convenience of description. In other words, because the sizes and thicknesses of elements in the drawings are arbitrarily illustrated for convenience of description, the disclosure is not limited thereto.

In the following embodiments, when X and Y are connected to each other, X and Y may be electrically connected to each other, X and Y may be functionally connected to each other, or X and Y may be directly connected to each other. Here, X and Y may be target objects (e.g., apparatuses, devices, circuits, lines, electrodes, terminals, conductive layers, or layers). Thus, the disclosure is not limited to a certain connection relationship, for example, a connection relationship indicated in the drawings or the detailed description, and may also include anything other than the connection relationship indicated in the drawings or the detailed description.

For example, when X and Y are electrically connected to each other, one or more devices (e.g., switches, transistors, capacitors, inductors, resistors, or diodes) enabling the electrical connection between X and Y may be connected between X and Y.

In the following embodiments, "ON" used in connection with a device state may refer to an activated state of the device, and "OFF" may refer to a deactivated state of the device. "ON" used in connection with a signal received by a device may refer to a signal activating the device, and "OFF" may refer to a signal deactivating the device. The device may be activated by a high-level voltage or a low-level voltage. For example, a P-channel transistor may be activated by a low-level voltage, and an N-channel transistor may be activated by a high-level voltage. Thus, it should be understood that "ON" voltages for the P-channel transistor and the N-channel transistor are opposite (low versus high) voltage levels.

In order to shorten a motion picture response time (MPRT) of a display apparatus, a technology for inserting a black image is presented herein. This technology erases an image of a previous frame by displaying a black image between displayed images. One or more embodiments of a display apparatus of the present disclosure include the technology of inserting the black image between the displayed images.

FIG. 1 is a diagram schematically illustrating a display apparatus according to an embodiment.

A display apparatus 10 according to embodiments may be implemented as an electronic apparatus such as a smart phone, a mobile phone, a smart watch, a navigation apparatus, a game machine, a television (TV), a vehicle head unit, a notebook computer, a laptop computer, a tablet computer, a personal media player (PMP), or a personal digital assistant (PDA). Also, the electronic apparatus may be a flexible apparatus.

Referring to FIG. 1, the display apparatus 10 may include a display panel 110, a scan driver 130, a data driver 150, and a controller 190. In FIG. 1, the display panel 110 is illustrated as being separate from driving circuits such as the scan driver 130; however, the disclosure is not limited thereto. For example, the scan driver 130 or the data driver 150 may be directly formed or integrated on the display panel 110.

The scan driver 130 may be connected to a plurality of first scan lines SL11 to SL1*n* and may generate a first scan signal in response to a scan control signal from the controller 190 and sequentially supply the first scan signal to the first scan lines SL11 to SL1*n*. The scan driver 130 may be connected to a plurality of second scan lines SL21 to SL2*n* and may generate a second scan signal in response to a scan control signal from the controller 190 and sequentially supply the second scan signal to the second scan lines SL21 to SL2*n*. The scan driver 130 may be connected to a plurality of third scan lines SL31 to SL3*n* and may generate a third scan signal in response to a scan control signal from the controller 190 and sequentially supply the third scan signal to the third scan lines SL31 to SL3*n*. The first to third scan signals may be set to an ON voltage at which a transistor included in a pixel P may be turned on. The ON voltage may be a high-level or low-level voltage.

The data driver 150 may be connected to a plurality of data lines DL1 to DLm and may supply data signals to the data lines DL1 to DLm in a display period in response to a data control signal from the controller 190. The data signals supplied to the data lines DL1 to DLm may be supplied to pixels P supplied with a scan signal. For this purpose, the data driver 150 may supply data signals to the data lines DL1 to DLm in synchronization with the scan signal.

The display panel 110 may include a plurality of first to third scan lines SL11 to SL1*n*, SL21 to SL2*n*, and SL31 to SL3*n*, a plurality of data lines DL1 to DLm, and a plurality of pixels P connected thereto.

The plurality of pixels P may be repeatedly arranged in a first direction (row direction) D1 and a second direction (column direction) D2. In other words, the pixels P may be arranged in an m×n matrix where m is the number of columns and n is the number of rows. Each pixel P may be connected to a corresponding first scan line SL1 among the plurality of first scan lines SL11 to SL1*n*, a corresponding second scan line SL2 among the plurality of second scan lines SL21 to SL2*n*, a corresponding third scan line SL3 among the plurality of third scan lines SL31 to SL3*n*, and a corresponding data line DL among the plurality of data lines DL1 to DLm. Each pixel P of an nth row of pixels P may be connected to a particular first scan line SL1, a particular second scan line SL2, and a particular third scan line SL3.

The plurality of first scan lines SL11 to SL1*n* may be uniformly spaced apart from each other in the column direction, may extend in the row direction, and may each be configured to transmit a first scan signal. The plurality of second scan lines SL21 to SL2*n* may be uniformly spaced apart from each other in the column direction, may extend in the row direction, and may each be configured to transmit a second scan signal. The plurality of third scan lines SL31 to SL3*n* may be uniformly spaced apart from each other in the column direction, may extend in the row direction, and may each be configured to transmit a third scan signal. The plurality of data lines DL1 to DLm may be uniformly spaced apart from each other in the row direction, may extend in the column direction, and may each be configured to transmit a data signal.

When the display panel 110 is a display panel of an organic light emitting display apparatus, a first power voltage ELVDD and a second power voltage ELVSS may be supplied to the pixels P of the display panel 110. The first power voltage ELVDD may be a high-level voltage provided to a first electrode (pixel electrode or anode electrode) of a display element included in each pixel P. The second power voltage ELVSS may be a low-level voltage provided to a second electrode (opposite electrode or cathode electrode) of the display element included in each pixel P. The first power voltage ELVDD and the second power voltage ELVSS may be driving voltages for emitting light of the plurality of pixels P. In an embodiment, an initialization voltage VINT may be further supplied to the pixels P of the display panel 110.

The controller 190 may generate a scan control signal and a data control signal based on signals input from the outside. The controller 190 may supply the scan control signal to the scan driver 130 and supply the data control signal to the data driver 150.

The scan control signal may include a plurality of clock signals CR_CK1 to CR_CK6, SC_CK1 to SC_CK6, SS_CK1 to SS_CK6, BICR_CK1 and BICR_CK2, and BISC_CK1 and BISC_CK2, a first start signal STV, and a second start signal BI_STV. The first start signal STV may control output timing of a first scan signal and a second scan signal. The second start signal BI_STV may control output timing of a third scan signal.

The data control signal may include a source start signal and clock signals. The source start signal may control a sampling start point of data, and the clock signals may be used to control a sampling operation.

Hereinafter, an organic light emitting display apparatus will be described as an example of the display apparatus according to an embodiment; however, the display apparatus of the disclosure is not limited thereto. In other embodiments, the display apparatus of the disclosure may be a display apparatus such as an inorganic light emitting display apparatus (or inorganic EL display apparatus) or a quantum dot light emitting display apparatus.

Figure 2:
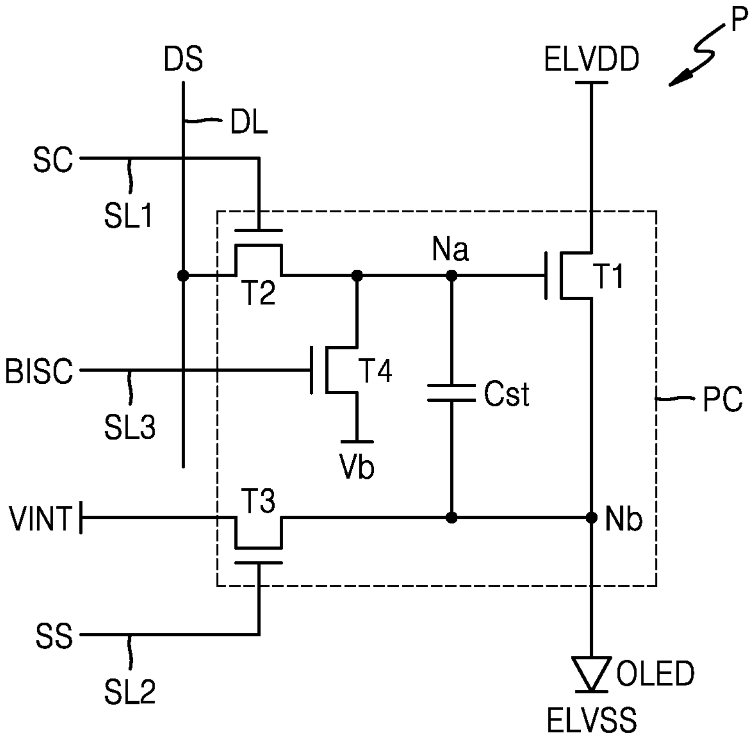
FIG. 2 is an equivalent circuit diagram illustrating a pixel according to an embodiment.

FIG. 2 is an equivalent circuit diagram illustrating a pixel according to an embodiment.

Referring to FIG. 2, each of the pixels P may include a pixel circuit PC and an organic light emitting diode OLED as a display element connected to the pixel circuit PC. The pixel circuit PC may include a first transistor T1 (driving transistor), a second transistor T2 (switching transistor), a third transistor T3 (first control transistor), a fourth transistor T4 (second control transistor), and a capacitor Cst.

The first transistor T1 may include a first electrode connected to a first power supply for supplying a first power voltage ELVDD and a second electrode connected to a first electrode (pixel electrode) of the organic light emitting diode OLED. A gate electrode of the first transistor T1 may be connected to a node Na. The first transistor T1 may control a driving current flowing from the first power supply through the organic light emitting diode OLED, in response to a voltage stored in the capacitor Cst. The organic light emitting diode OLED may emit light with a certain brightness according to the driving current.

The second transistor T2 may include a gate electrode connected to a first scan line SL1, a first electrode connected to a data line DL, and a second electrode connected to the node Na. The second transistor T2 may be turned on according to a first scan signal SC input through the first scan line SL1, to electrically connect the data line DL to the node Na and transmit a data signal DS input through the data line DL to the node Na.

The third transistor T3 may include a gate electrode connected to a second scan line SL2, a first electrode connected to the second electrode of the first transistor T1, and a second electrode connected to a third power supply for supplying an initialization voltage VINT. The third transistor T3 may be turned on by a second scan signal SS supplied to a second scan line SL2, to transmit the initialization voltage VINT to the second electrode (node Nb) of the first transistor T1.

The fourth transistor T4 may include a gate electrode connected to a third scan line SL3, a first electrode connected to the gate electrode of the first transistor T1, and a second electrode where a voltage for turning off the first transistor T1 is applied. In an embodiment, the second electrode of the fourth transistor T4 may be connected to a power supply where a black voltage Vb is applied. The fourth transistor T4 may be turned on by a third scan signal BISC supplied to a third scan line SL3, to transmit the black voltage Vb to the gate electrode of the first transistor T1. In an embodiment, the black voltage Vb may be a second power voltage ELVSS. In other embodiments, the black voltage Vb may be a certain voltage by which the display apparatus may display black, and may be, for example, a low voltage of about 2 V or less.

The capacitor Cst may be connected between the node Na and the second electrode of the first transistor T1. The capacitor Cst may store a voltage corresponding to the difference between the voltage received from the second transistor T2 and the potential of the second electrode of the first transistor T1.

The organic light emitting diode OLED may include a first electrode (pixel electrode) connected to the second electrode of the first transistor T1 and a second electrode (opposite electrode) connected to a second power supply where a second power voltage (a common voltage) ELVSS is applied. The organic light emitting diode OLED may emit light with a brightness corresponding to the amount of the driving current supplied from the first transistor T1.

In FIG. 2, N-type transistors are illustrated as the transistors of the pixel circuit; however, the present embodiments are not limited thereto. For example, according to various embodiments, the transistors of the pixel circuit may be P-type transistors, or some may be P-type transistors and others may be N-type transistors.

In FIG. 2, the fourth transistor T4 is configured to transmit the second power voltage ELVSS as the black voltage Vb to the gate electrode of the first transistor T1; however, in other embodiments, the fourth transistor T4 may be connected to a separate power supply for supplying a voltage for turning off the first transistor T1.

According to embodiments, at least the first transistor T1 may be an oxide semiconductor thin film transistor including an active layer including an amorphous or crystalline oxide semiconductor. For example, the first to fourth transistors T1 to T4 may be oxide semiconductor thin film transistors. The oxide semiconductor thin film transistor may have excellent off-current characteristics. Alternatively, according to embodiments, at least one of the first to fourth transistors T1 to T4 may be a low-temperature polysilicon (LTPS) thin film transistor including an active layer including polysilicon. The LTPS thin film transistor may have high electron mobility and accordingly may have fast driving characteristics.

Figure 3A:
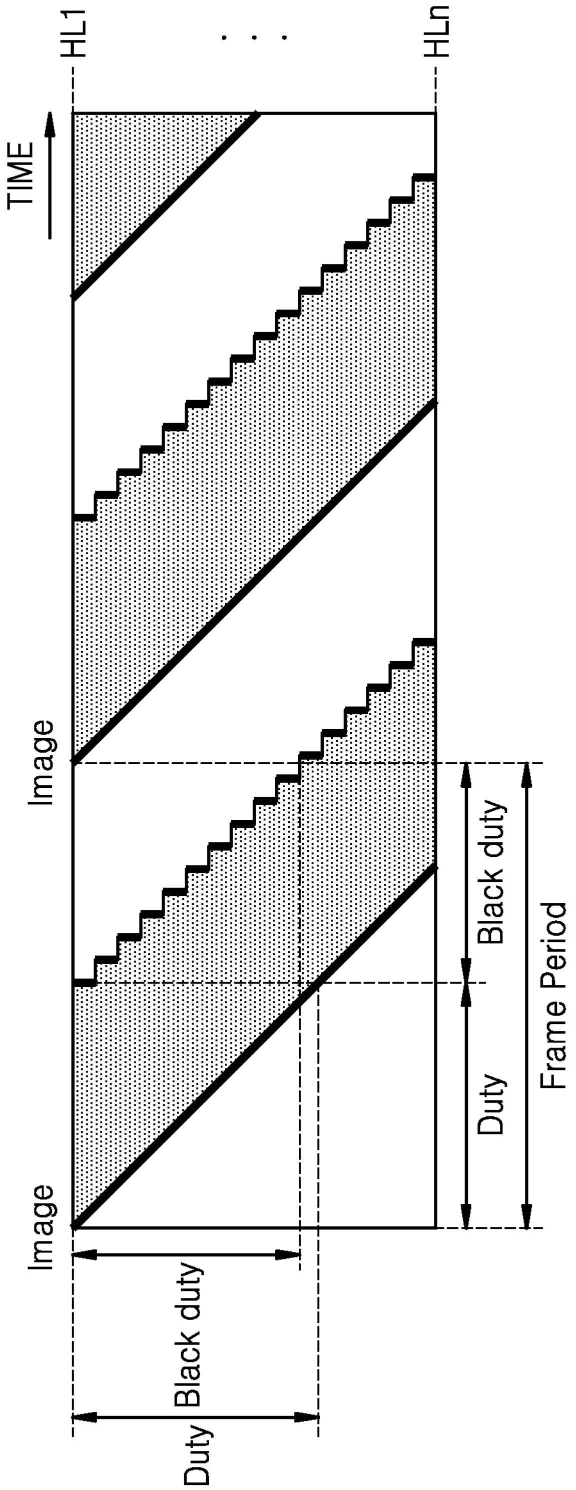
FIGS. 3A and 3B are diagrams for describing driving of a display apparatus according to an embodiment.
Figure 3B:
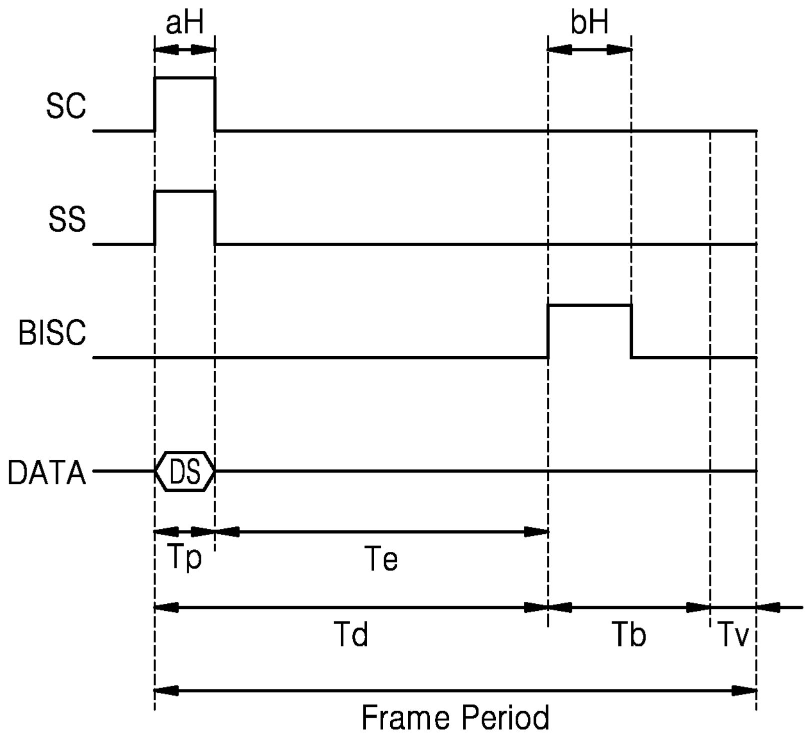

FIGS. 3A and 3B are diagrams for describing driving of a display apparatus according to an embodiment. FIG. 3B illustrates driving timing of a first scan signal SC, a second scan signal SS, and a third scan signal BISC applied to a pixel arranged in a certain row among first to (n)th rows HL1 to HLn.

Referring to FIGS. 3A and 3B, a frame period of the display apparatus may be divided into a display period Td in which an image is displayed, a black insertion period Tb in which black is displayed, and a vertical blank period Tv in which sensing (e.g., sensing of the threshold voltage, mobility, degradation information of a driving transistor or an organic light emitting diode) is performed. Because pixel sensing is performed in the vertical blank period Tv, the vertical blank period Tv may be understood as including a sensing period. The display apparatus may display black in the black insertion period Tb and the vertical blank period Tv.

The display period Td may be a period in which the pixels P of the display panel 110 display a certain image in response to a data signal. The display period Td may include a programming period Tp in which a data signal DS is applied to a pixel P and an emission period Te in which the pixel P emits light with a brightness corresponding to the data signal DS. The first scan signal SC and the second scan signal SS applied in the programming period Tp may overlap each other and may have the same phase. Accordingly, the second transistor T2 and the third transistor T3 may be turned on in the programming period Tp and thus the voltage between the node Na (see FIG. 2) and the node Nb (see FIG. 2) of the pixel P may be set in accordance with the driving current.

The black insertion period Tb may be a non-emission period in which the pixel P does not emit light. When the third scan signal BISC is applied to the pixel P in the black insertion period Tb and thus the fourth transistor T4 is turned on, the black voltage Vb, for example, the second power voltage ELVSS, may be applied to the gate electrode of the first transistor T1 to turn off the first transistor T1.

The display apparatus may perform duty driving for controlling the black insertion period Tb to control the emission duty of the organic light emitting diode OLED in a frame period.

In an embodiment, the first scan signal SC, the second scan signal SS, and the third scan signal BISC may be applied as an ON voltage in a certain horizontal period. For example, the first scan signal SC and the second scan signal SS may be applied as an ON voltage for "a" horizontal periods aH (a: a natural number greater than or equal to 1), and the third scan signal BISC may be applied as an ON voltage for "b" horizontal periods bH (b: a natural number greater than or equal to 1). In an embodiment, "a" may be 2, and "b" may be a multiple of 2. Here, the ON voltage may be a turn-on voltage of the transistor and may be a high-level voltage.

Figure 4:
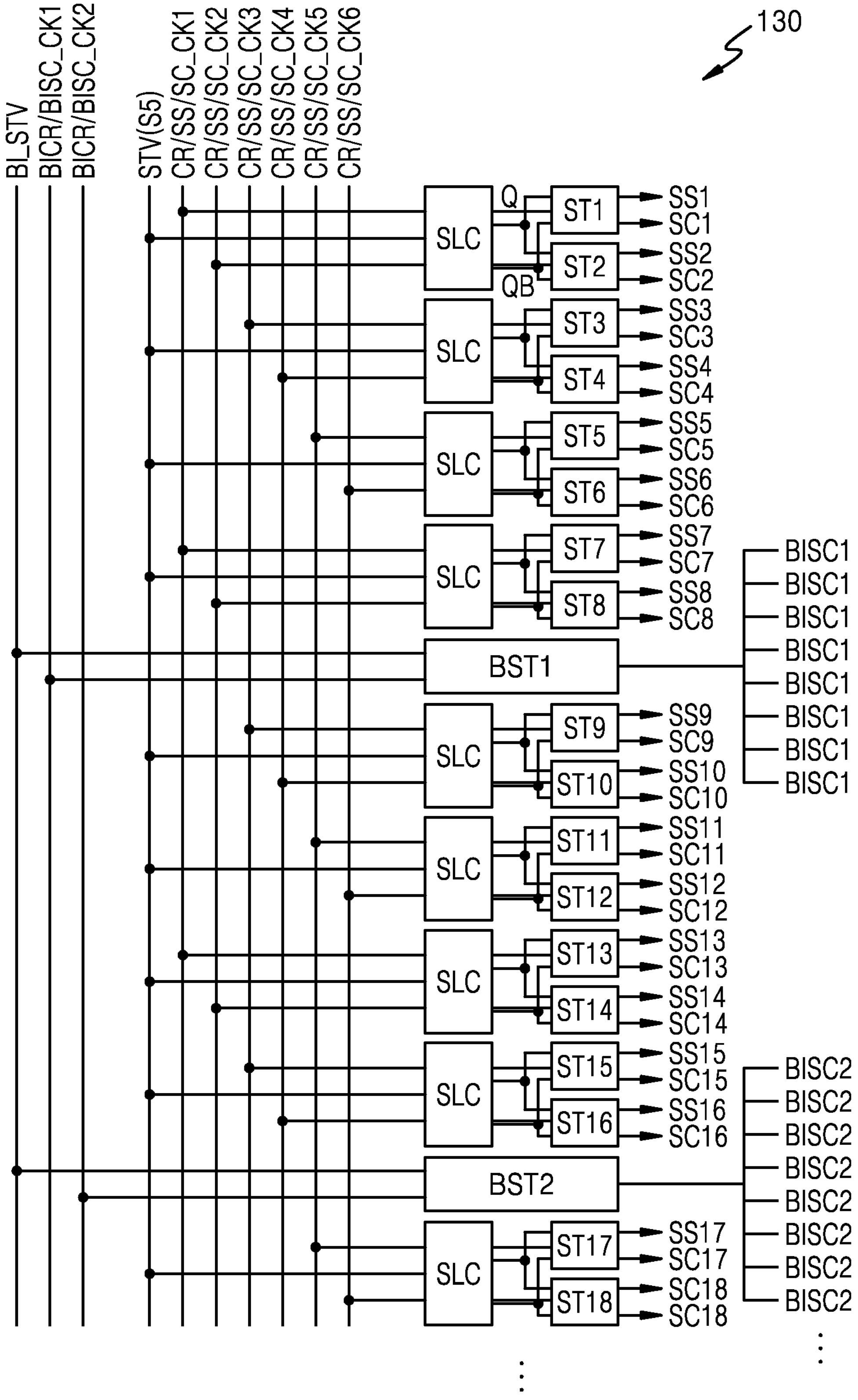
FIG. 4 is a diagram schematically illustrating a scan driver according to an embodiment.

FIG. 4 is a diagram schematically illustrating a scan driver according to an embodiment.

Referring to FIG. 4, the scan driver 130 may include a plurality of selection driving circuits SLC, a plurality of first stages ST1 to STn, and a plurality of second stages BST1 to BSTk (k<n).

The plurality of first stages ST1 to STn may sequentially output each of a first scan signal and a second scan signal to a first scan line and a second scan line in a frame period. The plurality of second stages BST1 to BSTk may sequentially output a third scan signal in a frame period, and each of the plurality of second stages BST1 to BSTk may transmit a third scan signal to a plurality of third scan lines simultaneously.

The number of second stages BST1 to BSTk may be less than the number of first stages ST1 to STn. For example, the number of first stages ST1 to STn and the number of second stages BST1 to BSTk may be in the ratio of b:1 (b: a multiple of 2). That is, the number of second stages BST1 to BSTk may be 1/b of the number of first stages ST1 to STn. FIG. 4 illustrates a plurality of second stages BST1 to BSTk as an example when b=8.

The selection driving circuit SLC and the plurality of first stages ST1 to STn may start driving by receiving the first start signal STV.

Each of the selection driving circuits SLC may be shared by a pair of first stages arranged in odd-numbered and even-numbered rows. The pair of first stages may be connected to the selection driving circuit SLC through a first control node Q and a second control node QB that are common nodes.

Each of the selection driving circuits SLC may receive a previous carry signal. The previous carry signal may be a carry signal output from the first stage connected to the selection driving circuit SLC or from any one of the first stages connected to other selection driving circuits SLC but is not particularly limited thereto.

Each of the first stages ST1 to STn may be connected to one of the first scan lines SL11 to SL1*n* and one of the second scan lines SL21 to SL2*n* and may supply the first scan signal SC to the connected first scan line and the second scan signal SS to the connected second scan line in response to one of the six first control clock signals SC_CK1 to SC_CK6 and one of the six second control clock signals SS_CK1 to SS_CK6. Each of the first stages ST1 to STn may supply the first carry signal to the previous or next first stage in response to one of the six first carry clock signals CR_CK1 to CR_CK6. The previous stage may be at least one-previous stage, and the next stage may be at least one-next stage.

The first carry clock signals CR_CK1 to CR_CK6, the first control clock signals SC_CK1 to SC_CK6, and the second control clock signals SS_CK1 to SS_CK6 may be set as square-wave signals that repeat high voltage and low voltage. Here, the high-voltage period may be set shorter than the low-voltage period. The high-voltage period may correspond to the width of the scan signal and may be variously set corresponding to the circuit structure of the pixel P. The six first carry clock signals CR_CK1 to CR_CK6 may be set as signals having the same period and shifted phases. The six first control clock signals SC_CK1 to SC_CK6 may be set as signals having the same period and shifted phases. The six second control clock signals SS_CK1 to SS_CK6 may be set as signals having the same period and shifted phases.

Each of the second stages BST1 to BSTk may be located between the eight first stages and may start driving by receiving the second start signal BI_STV.

Each of the second stages BST1 to BSTk may be connected to eight of the third scan lines SL31 to SL3*n* and may simultaneously supply the third scan signal BISC to the eight third scan lines in response to one of the two third control clock signals BISC_CK1 and BISC_CK2. Each of the second stages BST1 to BSTk may supply the second carry signal to the previous or next second stage in response to one of the two second carry clock signals BICR_CK1 and BICR_CK2. The previous stage may be at least one-previous stage, and the next stage may be at least one-next stage.

The second carry clock signals BICR_CK1 and BICR_CK2 and the third control clock signals BISC_CK1 and BISC_CK2 may be set as square-wave signals that repeat high voltage and low voltage. Here, the high-voltage period may be set shorter than the low-voltage period. The high-voltage period may correspond to the width of the scan signal and may be variously set corresponding to the circuit structure of the pixel P. The two second carry clock signals BICR_CK1 and BICR_CK2 may be set as signals having the same period and shifted phases. The two third control clock signals BISC_CK1 and BISC_CK2 may be set as signals having the same period and shifted phases.

Although not illustrated, at least one dummy stage may be further provided previous to the first first stage ST1 among the plurality of first stages ST1 to STn, and at least one dummy stage may be further provided next to the last first stage STn. The dummy stage may not be connected to the first scan line and the second scan line. According to embodiments, the dummy stage may be connected to a dummy scan line, but the dummy scan line may be connected to a dummy pixel that does not display an image, and the dummy stage may not be used to display an image. For example, four dummy stages may be provided previous to the first first stage ST1, and four dummy stages may be provided next to the last first stage STn.

Similarly, at least one dummy stage may be further provided previous to the first second stage BST1 and next to the last second stage BSTk among the plurality of second stages BST1 to BSTk. The dummy stage may not be connected to the third scan line. For example, one dummy stage may be provided at each of previous to the first second stage BST1 and next to the last second stage BSTk.

The selection driving circuit SLC, the first stage ST, and the second stage BST may include a plurality of nodes, and hereinafter, some of a plurality of nodes in the first stage ST will be referred to as first to fifth nodes N1 to N5, first to third output nodes N6 to N8, and first and second control nodes Q and BQ, and some of a plurality of nodes in the second stage BST will be referred to as a ninth node N9, fourth and fifth output nodes N10 and N11, and first and second control nodes BQ and BQB. Hereinafter, a selection driving circuit SLC, a first stage STi, and a second stage BSTj that output the first to third scan signals to the (i)th row will be described as an example.

Although FIG. 4 illustrates that each of the second stages is located between the eight first stages, the present embodiments are not limited thereto. For example, each of the second stages may be located between "b" (b: a multiple of 2) first stages and thus each of the second stages may simultaneously supply the third scan signal BISC to the "b" third scan lines. A dead space may be reduced by reducing the number of second stages. Hereinafter, for convenience, a case where "b" is 8 will be described as an example, and this may also be similarly applied to other embodiments in which "b" is a multiple of 2.

Hereinafter, for convenience of description, when a certain signal is supplied, it may mean that a gate-on voltage (e.g., a high voltage) is supplied, and when a certain signal is not supplied, it may mean that a gate-off voltage (e.g., a low voltage) is supplied.

Figure 5:
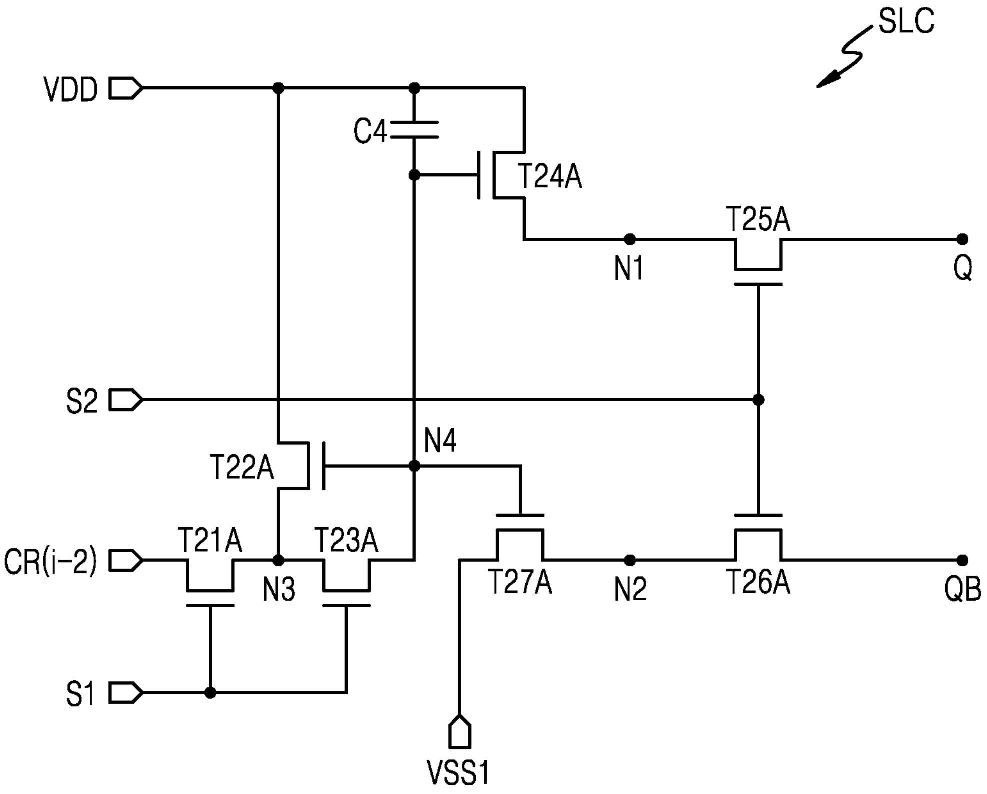
FIG. 5 is a circuit diagram schematically illustrating a selection driving circuit according to an embodiment.

FIG. 5 is a circuit diagram schematically illustrating a selection driver according to an embodiment.

The selection driving circuit SLC may set the voltage of the first control node Q to an ON voltage to allow the first stage to output the first scan signal and the second scan signal to the pixel P in order to sense the mobility of the pixel P, for example, the mobility of the driving transistor, in the sensing period.

The selection driving circuit SLC may supply a first voltage VDD to the first control node Q of the first stage STi and supply a second voltage VSS1 to the second control node QB in order to sense the mobility of the pixel.

The selection driving circuit SLC may include an input terminal of the first voltage VDD, an input terminal of a first control signal S1, an input terminal of a second control signal S2, an input terminal of an (i−2)th carry signal CR(i−2), and an input terminal of the second voltage VSS1. The first control signal S1 may be a signal applied at a certain timing in the display period Td. For example, the first control signal S1 may be applied at an application timing of the (i−2)th first carry signal CR(i−2). The (i−2)th first carry signal CR(i−2) may be a signal for charging the first control node Q for sensing in the display period Td. The second control signal S2 may be a signal for supplying the first voltage VDD to the first control node Q for sensing by being supplied in the vertical blank period Tv.

The selection driving circuit SLC may include twenty-first to twenty-seventh transistors T21A to T27A and a fourth capacitor C4.

A first electrode of the fourth capacitor C4 may be connected to the input terminal of the first voltage VDD, and a second electrode thereof may be connected to a gate electrode (i.e., a fourth node N4) of the twenty-fourth transistor T24A. The fourth capacitor C4 may store the voltage difference between the first voltage VDD and the voltage of the gate electrode of the twenty-fourth transistor T24A. Here, the first voltage VDD may be set to, for example, a gate-on voltage.

The twenty-first transistor T21A may be connected between the input terminal of the (i−2)th first carry signal CR(i−2) and a third node N3. A gate electrode of the twenty-first transistor T21A may be connected to the input terminal of the first control signal S1. When the first control signal S1 is supplied, the twenty-first transistor T21A may be turned on to supply a voltage corresponding to the (i−2)th first carry signal CR(i−2) to the third node N3. The (i−2)th first carry signal CR(i−2) may be the first carry signal output by a first stage ST(i−2) two-previous to the first stage STi connected to the selection driving circuit SLC.

The first start signal STV may be input to the input terminal of the (i−2)th first carry signal CR(i−2) of the dummy stages, the first carry signal of the two-previous dummy stage may be input to the input terminal of the (i−2)th first carry signal CR(i−2) of the first and second first stages ST1 and ST2, and the first carry signal of the two-previous first stage ST(i−2) may be input to the input terminal of the (i−2)th first carry signal CR(i−2) from the third first stage ST3.

The twenty-second transistor T22A may be connected between the third node N3 and the input terminal of the first voltage VDD. A gate electrode of the twenty-second transistor T22A may be connected to the fourth node N4. The twenty-second transistor T22A may be turned on or off in response to the voltage of the fourth node N4.

The twenty-third transistor T23A may be connected between the third node N3 and the fourth node N4. A gate electrode of the twenty-third transistor T23A may be connected to the input terminal of the first control signal S1. When the first control signal S1 is supplied, the twenty-third transistor T23A may be turned on to supply the voltage of the third node N3 to the fourth node N4.

The twenty-fourth transistor T24A may be connected between the input terminal of the first voltage VDD and a first node N1. A gate electrode of the twenty-fourth transistor T24A may be connected to the fourth node N4. The twenty-fourth transistor T24A may be turned on or off in response to the voltage of the fourth node N4. When the twenty-fourth transistor T24A is turned on, the first voltage VDD may be supplied to the first node N1.

The twenty-fifth transistor T25A may be connected between the first node N1 and the first control node Q. A gate electrode of the twenty-fifth transistor T25A may be connected to the input terminal of the second control signal S2. When the second control signal S2 is supplied, the twenty-fifth transistor T25A may be turned on to electrically connect the first node N1 of the selection driving circuit SLC to the first control node Q of the first stage STi.

The twenty-sixth transistor T26A may be connected between a second node N2 and the second control node QB. A gate electrode of the twenty-sixth transistor T26A may be connected to the input terminal of the second control signal S2. When the second control signal S2 is supplied, the twenty-sixth transistor T26A may be turned on to electrically connect the second node N2 of the selection driving circuit SLC to the second control node QB of the first stage STi.

The twenty-seventh transistor T27A may be connected between the input terminal of the second voltage VSS1 and the second node N2. A gate electrode of the twenty-seventh transistor T27A may be connected to the fourth node N4. The twenty-seventh transistor T27A may be turned on or off in response to the voltage of the fourth node N4. When the twenty-seventh transistor T27A is turned on, the second voltage VSS1 may be supplied to the second node N2. The second voltage VSS1 may be a voltage set lower than the first voltage VDD and may be set to, for example, a gate-off voltage.

When the second control signal S2 is supplied, the twenty-fifth transistor T25A and the twenty-sixth transistor T26A may be turned on, a high voltage of the first voltage VDD may be supplied to the first control node Q of the first stage STi connected to the selection driving circuit SLC and a low voltage of the second voltage VSS1 may be supplied to the second control node QB.

Figure 6:
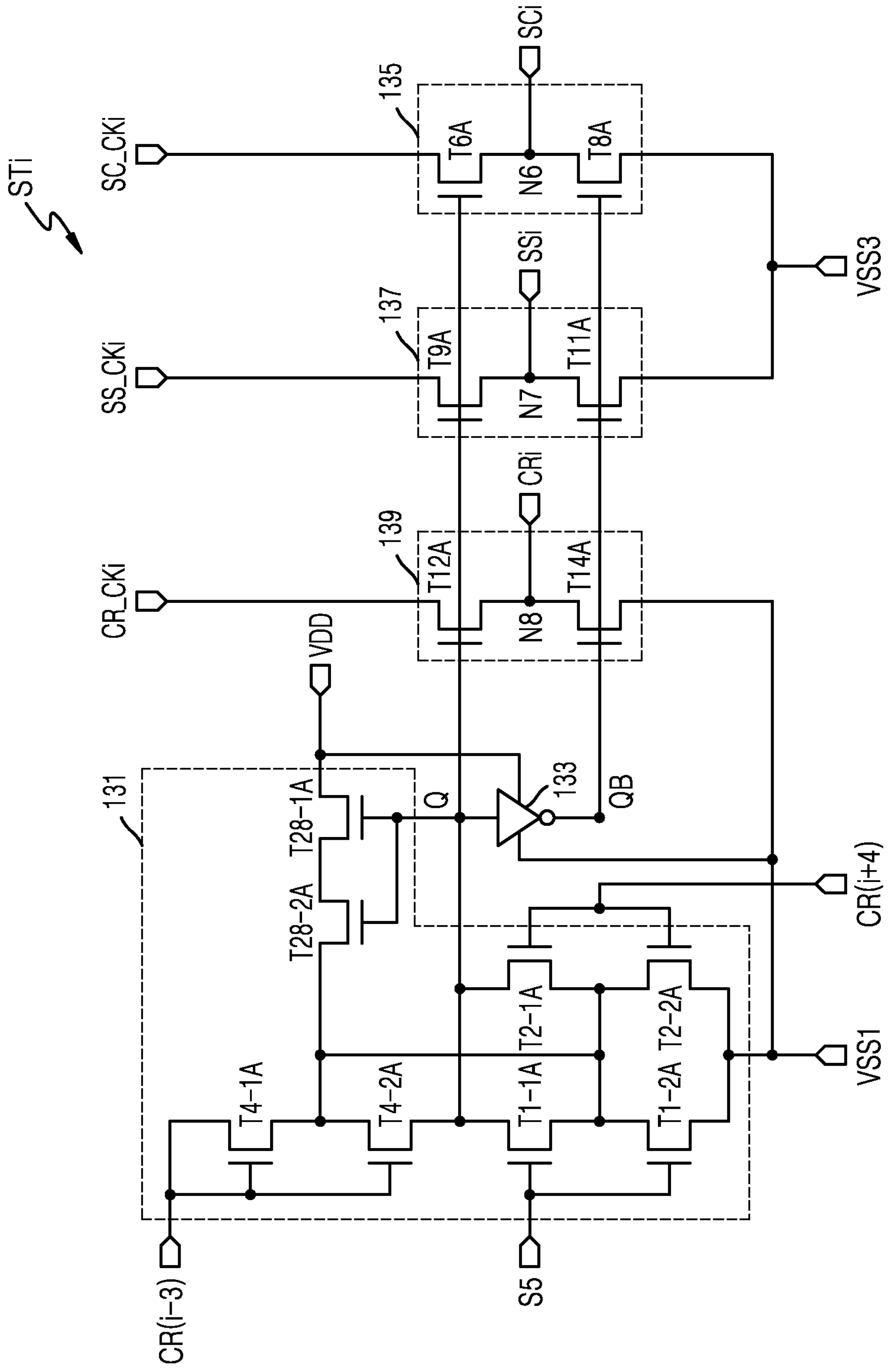
FIG. 6 is a diagram schematically illustrating a portion of a first stage according to an embodiment.

FIG. 6 is a diagram schematically illustrating a portion of a first stage according to an embodiment. As used herein, the term "stage" means an electrical circuit or a part of an electrical circuit.

The first stage STi may be connected to the selection driving circuit SLC through the first control node Q and the second control node QB. The first stage STi may include a first node controller 131, a first inverter 133, a first output controller 135, a second output controller 137, and a third output controller 139.

The first node controller 131 may be connected between the input terminal of the first voltage VDD and the input terminal of the second voltage VSS1. The first node controller 131 may set the voltage of the first control node Q to a high voltage or a low voltage according to an (i−3)th first carry signal CR(i−3), an (i+4)th first carry signal CR(i+4), and a fifth control signal S5. The fifth control signal S5 may be the first start signal STV. Also, the fifth control signal S5 may be a signal for resetting the voltage of the first control node Q. The (i−3)th first carry signal CR(i−3) may be a signal for precharging the first control node Q. The (i+4)th first carry signal CR(i+4) may be a signal for discharging the first control node Q. The first node controller 131 may include a first transistor, a second transistor, a fourth transistor, and a twenty-eighth transistor. As used herein, a “transistor” refers to a transistor unit that may be a single transistor or at least two transistors.

The first transistor may include a (1-1)th transistor T1-1A and a (1-2)th transistor T1-2A connected in series between the first control node Q and the input terminal of the second voltage VSS1. Gate electrodes of the (1-1)th transistor T1-1A and the (1-2)th transistor T1-2A may be connected to an input terminal of the fifth control signal S5. When the fifth control signal S5 is supplied, the (1-1)th transistor T1-1A and the (1-2)th transistor T1-2A may be turned on to set the voltage of the first control node Q to the second voltage VSS1.

The second transistor may include a (2-1)th transistor T2-1A and a (2-2)th transistor T2-2A connected in series between the first control node Q and the input terminal of the second voltage VSS1. Gate electrodes of the (2-1)th transistor T2-1A and the (2-2)th transistor T2-2A may be connected to an input terminal of the (i+4)th first carry signal CR(i+4). When the (i+4)th first carry signal CR(i+4) is supplied, the (2-1)th transistor T2-1A and the (2-2)th transistor T2-2A may be turned on to set the voltage of the first control node Q to the second voltage VSS1. The (i+4)th first carry signal CR(i+4) may be the carry signal output by a first stage ST(i+4) four-next to the first stage STi connected to the selection driving circuit SLC.

The fourth transistor may include a (4-1)th transistor T4-1A and a (4-2)th transistor T4-2A connected in series between the first control node Q and an input terminal of the (i−3)th first carry signal CR(i−3). Gate electrodes of the (4-1)th transistor T4-1A and the (4-2)th transistor T4-2A may be connected to the input terminal of the (i−3)th first carry signal CR(i−3). When the (i−3)th first carry signal CR(i−3) is supplied, the (4-1)th transistor T4-1A and the (4-2)th transistor T4-2A may be turned on to supply the (i−3)th first carry signal CR(i−3) to the first control node Q. The (i−3)th first carry signal CR(i−3) may be the carry signal output by a first stage ST(i−3) three-previous to the first stage STi connected to the selection driving circuit SLC.

Moreover, the first start signal STV (e.g., the fifth control signal S5) may be input to the input terminal of the (i−3)th first carry signal CR(i−3) of the dummy stages, and the first carry signal of the three-previous dummy stage may be input to the input terminals of the (i−3)th first carry signal CR(i−3) of the first to third first stages ST1 to ST3. The first carry signal of the three-previous first stage may be input to the input terminal of the (i−3)th first carry signal CR(i−3) from the fourth first stage ST4.

The twenty-eighth transistor may include a (28-1)th transistor T28-1A and a (28-2)th transistor T28-2A connected in series to the input terminal of the first voltage VDD and an intermediate node (common electrode) between the (4-1)th transistor T4-1A and the (4-2)th transistor T4-2A. Gate electrodes of the (28-1)th transistor T28-1A and the (28-2)th transistor T28-2A may be connected to the first control node Q. The (28-1)th transistor T28-1A and the (28-2)th transistor T28-2A may be turned on or off in response to the voltage of the first control node Q. Also, the twenty-eighth transistor may be connected in series to the input terminal of the first voltage VDD, an intermediate node (common electrode) between the (1-1)th transistor T1-1A and the (1-2)th transistor T1-2A, and an intermediate node (common electrode) between the (2-1)th transistor T2-1A and the (2-2)th transistor T2-2A.

That is, the first control node Q may be set (precharged) to a high voltage by the (i−3)th first carry signal CR(i−3) and may be set (discharged) to a low voltage by the (i+4)th first carry signal CR(i+4).

The first inverter 133 may be connected between the first control node Q and the second control node QB. The first inverter 133 may be driven by the first voltage VDD and may invert the voltage of the first control node Q and supply the inverted voltage to the second control node QB. The first inverter 133 may include at least one transistor, and a detailed structure thereof will be described below with reference to FIG. 7.

The first output controller 135 may output a first control clock signal SC_CKi or a fourth voltage VSS3 to a first output terminal connected to the first output node N6 according to the voltage of the first control node Q and the second control node QB. The first output controller 135 may include a sixth transistor T6A and an eighth transistor T8A connected between an input terminal of the first control clock signal SC_CKi and an input terminal of the fourth voltage VSS3.

The sixth transistor T6A may be connected between the input terminal of the first control clock signal SC_CKi and the first output terminal. A gate electrode of the sixth transistor T6A may be connected to the first control node Q. The sixth transistor T6A may be turned on or off in response to the voltage of the first control node Q. When the first control node Q is set to a high voltage, the sixth transistor T6A may be turned on to output the first control clock signal SC_CKi as a high voltage of a first scan signal SCi.

The eighth transistor T8A may be connected between the first output terminal and the input terminal of the fourth voltage VSS3. A gate electrode of the eighth transistor T8A may be connected to the second control node QB. The eighth transistor T8A may be turned on or off in response to the voltage of the second control node QB. When the second control node QB is set to a high voltage, the eighth transistor T8A may be turned on to output the fourth voltage VSS3 as a low voltage of the first scan signal SCi.

The second output controller 137 may output a second control clock signal SS_CKi or the fourth voltage VSS3 to a second output terminal connected to the second output node N7 according to the voltage of the first control node Q and the second control node QB. The second output controller 137 may include a ninth transistor T9A and an eleventh transistor T11A connected between an input terminal of the second control clock signal SS_CKi and the input terminal of the fourth voltage VSS3.

The ninth transistor T9A may be connected between the input terminal of the second control clock signal SS_CKi and the second output terminal. A gate electrode of the ninth transistor T9A may be connected to the first control node Q. The ninth transistor T9A may be turned on or off in response to the voltage of the first control node Q. When the first control node Q is set to a high voltage, the ninth transistor T9A may be turned on to output the second control clock signal SS_CKi as a high voltage of a second scan signal SSi.

The eleventh transistor T11A may be connected between the second output terminal and the input terminal of the fourth voltage VSS3. A gate electrode of the eleventh transistor T11A may be connected to the second control node QB. The eleventh transistor T11A may be turned on or off in response to the voltage of the second control node QB.

When the second control node QB is set to a high voltage, the eleventh transistor T11A may be turned on to output the fourth voltage VSS3 as a low voltage of the second scan signal SSi.

The third output controller 139 may output a first carry clock signal CR_CKi or the second voltage VSS1 to a third output terminal connected to the third output node N8 according to the voltage of the first control node Q and the second control node QB. The third output controller 139 may include a twelfth transistor T12A and a fourteenth transistor T14A connected between an input terminal of the first carry clock signal CR_CKi and the input terminal of the second voltage VSS1.

The twelfth transistor T12A may be connected between the input terminal of the first carry clock signal CR_CKi and the third output terminal. A gate electrode of the twelfth transistor T12A may be connected to the first control node Q. The twelfth transistor T12A may be turned on or off in response to the voltage of the first control node Q. When the first control node Q is set to a high voltage, the twelfth transistor T12A may be turned on to output the first carry clock signal CR_CKi as a high voltage of a first carry signal CRi.

The fourteenth transistor T14A may be connected between the third output terminal and the input terminal of the second voltage VSS1. A gate electrode of the fourteenth transistor T14A may be connected to the second control node QB. The fourteenth transistor T14A may be turned on or off in response to the voltage of the second control node QB. When the second control node QB is set to a high voltage, the fourteenth transistor T14A may be turned on to output the second voltage VSS1 as a low voltage of the first carry signal CRi.

Figure 7:
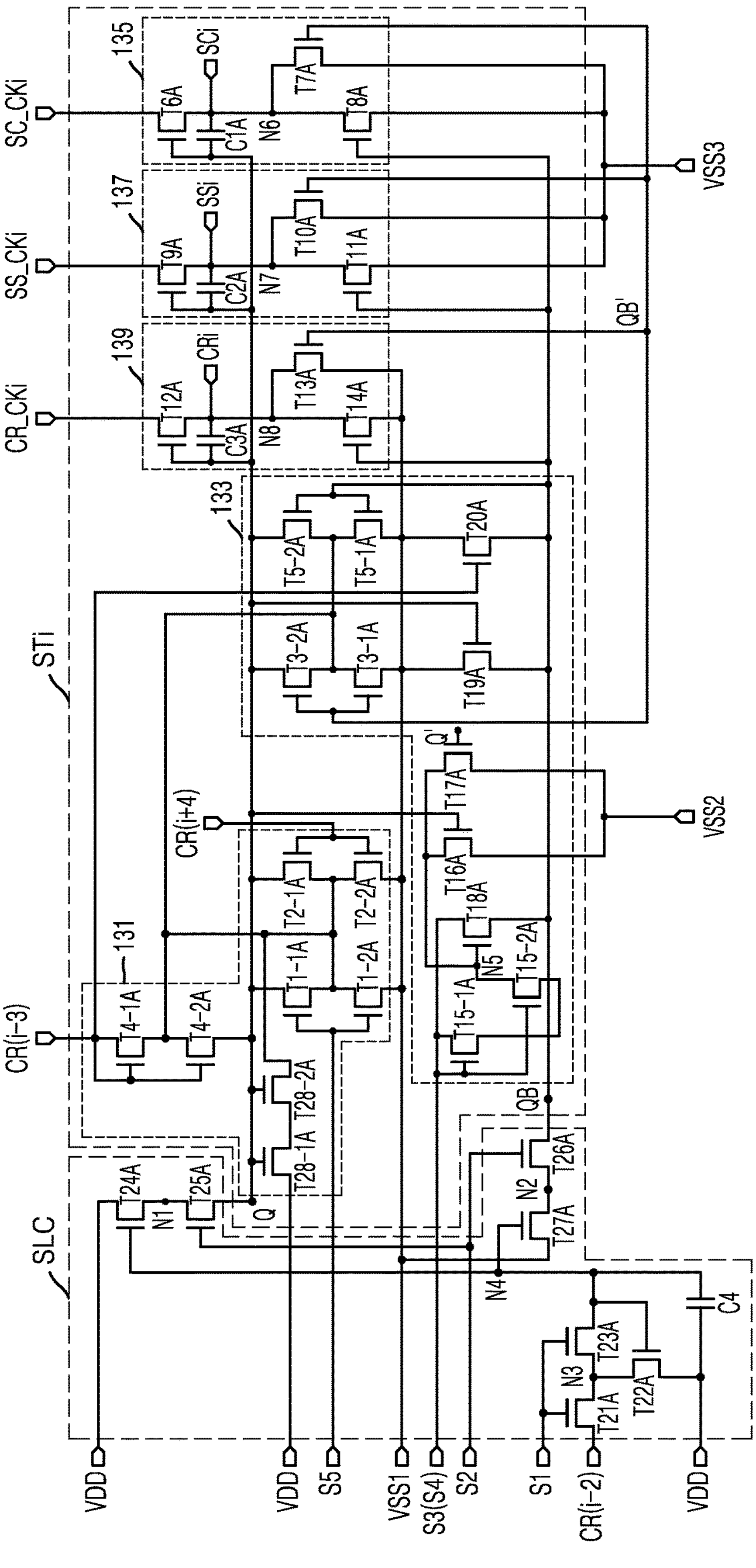
FIG. 7 is a circuit diagram illustrating in more detail a selection driving circuit and the first stage illustrated in FIGS. 5 and 6.

FIG. 7 is a circuit diagram illustrating in more detail a selection driving circuit and the first stage illustrated in FIGS. 5 and 6.

Referring to FIG. 7, the first stage STi may be connected to the corresponding selection driving circuit SLC and may include a first node controller 131, a first inverter 133, a first output controller 135, a second output controller 137, and a third output controller 139. Hereinafter, redundant descriptions already given above with reference to FIGS. 5 and 6 will be omitted for conciseness.

The selection driving circuit SLC may include twenty-first to twenty-seventh transistors T21A to T27A and a fourth capacitor C4. The selection driving circuit SLC may be connected to a first stage of an odd-numbered row and a first stage of an even-numbered row. The first stage of the odd-numbered row and the first stage of the even-numbered row may be similar to each other but may be different from each other in that the first stage of the odd-numbered row may receive a third control signal S3 through an input terminal of the third control signal S3 and the first stage of the even-numbered row may receive a fourth control signal S4 through the input terminal of the third control signal S3. The third control signal S3 may be applied at a high level or a low level in one frame. The fourth control signal S4 may be a signal in which the phase of the third control signal S3 is inverted. Hereinafter, the (i)th first stage STi will be described as an example.

The first node controller 131 may include a first transistor, a second transistor, a fourth transistor, and a twenty-eighth transistor. The first transistor may include a (1-1)th transistor T1-1A and a (1-2)th transistor T1-2A. The second transistor may include a (2-1)th transistor T2-1A and a (2-2)th transistor T2-2A. The fourth transistor may include a (4-1)th transistor T4-1A and a (4-2)th transistor T4-2A. The twenty-eighth transistor may include a (28-1)th transistor T28-1A and a (28-2)th transistor T28-2A.

The first inverter 133 may set the second control node QB to a low voltage while the first control node Q is at a high voltage, and may set the second control node QB to a high voltage while the first control node Q is at a low voltage. The first inverter 133 may include a third transistor, a fifth transistor, a fifteenth transistor, and sixteenth to twentieth transistors T16A to T20A.

The third transistor may include a (3-1)th transistor T3-1A and a (3-2)th transistor T3-2A connected in series between the first control node Q and the input terminal of the second voltage VSS1. Gate electrodes of the (3-1)th transistor T3-1A and the (3-2)th transistor T3-2A may be connected to a second control node QB' of a next first stage STi+1. The (3-1)th transistor T3-1A and the (3-2)th transistor T3-2A may be turned on or off in response to the voltage of the second control node QB' of the next first stage STi+1. When the second control node QB' of the next first stage STi+1 is set to a high voltage, the (3-1)th transistor T3-1A and the (3-2)th transistor T3-2A may be turned on to supply the second voltage VSS1 to the first control node Q.

The fifth transistor may include a (5-1)th transistor T5-1A and a (5-2)th transistor T5-2A connected in series between the first control node Q and the input terminal of the second voltage VSS1. Gate electrodes of the (5-1)th transistor T5-1A and the (5-2)th transistor T5-2A may be connected to the second control node QB. The (5-1)th transistor T5-1A and the (5-2)th transistor T5-2A may be turned on or off in response to the voltage of the second control node QB. When the second control node QB is set to a high voltage, the (5-1)th transistor T5-1A and the (5-2)th transistor T5-2A may be turned on to supply the second voltage VSS1 to the first control node Q.

An intermediate node (common electrode) between the (3-1)th transistor T3-1A and the (3-2)th transistor T3-2A, an intermediate node (common electrode) between the (5-1)th transistor T5-1A and the (5-2)th transistor T5-2A, an intermediate node (common electrode) between the (1-1)th transistor T1-1A and the (1-2)th transistor T1-2A, an intermediate node (common electrode) between the (2-1)th transistor T2-1A and the (2-2)th transistor T2-2A, and an intermediate node (common electrode) between the (4-1)th transistor T4-1A and the (4-2)th transistor T4-2A may be connected to each other and may be supplied with the first voltage VDD when the twenty-eighth transistor is turned on.

The fifteenth transistor may include a (15-1)th transistor T15-1A and a (15-2)th transistor T15-2A connected in series between the input terminal of the third control signal S3 and a gate electrode (i.e., a fifth node N5) of the eighteenth transistor T18A. Gate electrodes of the (15-1)th transistor T15-1A and the (15-2)th transistor T15-2A may be connected to the input terminal of the third control signal S3. When the third control signal S3 is supplied, the (15-1)th transistor T15-1A and the (15-2)th transistor T15-2A may be connected in the form of a diode to supply the third control signal S3 to the fifth node N5.

The sixteenth transistor T16A may be connected between the fifth node N5 and the input terminal of the third voltage VSS2. A gate electrode of the sixteenth transistor T16A may be connected to the first control node Q. When the first control node Q is set to a high voltage, the sixteenth transistor T16A may be turned on to supply the third voltage VSS2 to the fifth node N5. The third voltage VSS2 may be set to a voltage lower than the second voltage VSS1 and higher than the fourth voltage VSS3.

The seventeenth transistor T17A may be connected between the fifth node N5 and the input terminal of the third voltage VSS2. A gate electrode of the seventeenth transistor T17A may be connected to a first control node Q' of the next first stage STi+1. The seventeenth transistor T17A may be turned on or off in response to the voltage of the first control node Q' of the next first stage STi+1. When the first control node Q' of the next first stage STi+1 is set to a high voltage, the seventeenth transistor T17A may be turned on to supply the third voltage VSS2 to the fifth node N5.

The eighteenth transistor T18A may be connected between the input terminal of the third control signal S3 and the second control node QB. A gate electrode of the eighteenth transistor T18A may be connected to the fifth node N5. The eighteenth transistor T18A may be turned on or off in response to the voltage of the fifth node N5. As the eighteenth transistor T18A is turned on, the voltage of the third control signal S3 may be supplied to the second control node QB.

The nineteenth transistor T19A may be connected between the second control node QB and the input terminal of the second voltage VSS1. A gate electrode of the nineteenth transistor T19A may be connected to the first control node Q. When a high voltage is supplied to the first control node Q, the nineteenth transistor T19A may be turned on to set the voltage of the second control node QB to the second voltage VSS1.

The twentieth transistor T20A may be connected between the second control node QB and the input terminal of the second voltage VSS1. A gate electrode of the twentieth transistor T20A may be connected to the input terminal of the (i−3)th first carry signal CR(i−3). When the (i−3)th first carry signal CR(i−3) is supplied, the twentieth transistor T20A may be turned on to set the voltage of the second control node QB to the second voltage VSS1.

The first output controller 135 may include a sixth transistor T6A and an eighth transistor T8A. The first output controller 135 may further include a seventh transistor T7A and a first capacitor C1A.

The seventh transistor T7A may be connected between the first output node N6 and the input terminal of the fourth voltage VSS3. A gate electrode of the seventh transistor T7A may be connected to the second control node QB' of the next first stage. When the second control node QB' of the next first stage is set to a high voltage, the seventh transistor T7A may be turned on to set the voltage of the first output node N6 to the fourth voltage VSS3. The fourth voltage VSS3 may be set to a voltage lower than the second voltage VSS1.

The first output controller 135 may set the voltage of the first output node N6 to the fourth voltage VSS3 by the eighth transistor T8A when the high-level third control signal S3 or the fourth control signal S4 is input, and may set the voltage of the first output node N6 to the fourth voltage VSS3 by the seventh transistor T7A when the low-level third control signal S3 or the fourth control signal S4 is input.

The first capacitor C1A may be connected between the first output node N6 and the first control node Q. When the first control node Q is charged to a high voltage, the sixth transistor T6A may be turned on and thus the first control clock signal SC_CKi may be output as a high voltage of the first scan signal SCi, and in this case, the voltage of the first control node Q may be bootstrapped by the first capacitor C1A.

The second output controller 137 may include a ninth transistor T9A and an eleventh transistor T11A. The second output controller 137 may further include a tenth transistor T10A and a second capacitor C2A.

The tenth transistor T10A may be connected between the second output node N7 and the input terminal of the fourth voltage VSS3. A gate electrode of the tenth transistor T10A may be connected to the second control node QB' of the next first stage STi+1. When the second control node QB' of the next first stage STi+1 is set to a high voltage, the tenth transistor T10A may be turned on to set the voltage of the second output node N7 to the fourth voltage VSS3.

The second output controller 137 may set the voltage of the second output node N7 to the fourth voltage VSS3 by the eleventh transistor T11A when the high-level third control signal S3 or the fourth control signal S4 is input, and may set the voltage of the second output node N7 to the fourth voltage VSS3 by the tenth transistor T10A when the low-level third control signal S3 or the fourth control signal S4 is input.

The second capacitor C2A may be connected between the second output node N7 and the first control node Q. When the first control node Q is charged to a high voltage, the ninth transistor T9A may be turned on and thus the second control clock signal SS_CKi may be output as a high voltage of the second scan signal SSi, and in this case, the voltage of the first control node Q may be bootstrapped by the second capacitor C2A.

The third output controller 139 may include a twelfth transistor T12A and a fourteenth transistor T14A. The third output controller 139 may further include a thirteenth transistor T13A and a third capacitor C3A.

The thirteenth transistor T13A may be connected between the third output node N8 and the input terminal of the second voltage VSS1. A gate electrode of the thirteenth transistor T13A may be connected to the second control node QB' of the next first stage STi+1. When the second control node QB' of the next first stage STi+1 is set to a high voltage, the thirteenth transistor T13A may be turned on to set the voltage of the third output node N8 to the second voltage VSS1.

The third output controller 139 may set the voltage of the third output node N8 to the second voltage VSS1 by the fourteenth transistor T14A when the high-level third control signal S3 or the fourth control signal S4 is input, and may set the voltage of the third output node N8 to the second voltage VSS1 by the thirteenth transistor T13A when the low-level third control signal S3 or the fourth control signal S4 is input.

The third capacitor C3A may be connected between the third output node N8 and the first control node Q. When the first control node Q is charged to a high voltage, the twelfth transistor T12A may be turned on and thus the first carry clock signal CR_CKi may be output as a high voltage of the first carry signal CRi, and in this case, the voltage of the first control node Q may be bootstrapped by the third capacitor C3A.

The first control node Q may be increased by the capacitance ratio of the first to third capacitors C1A, C2A, and C3A, and thus the signals output from the first to third output nodes N6 to N8 may be fully swung.

Figure 8A:
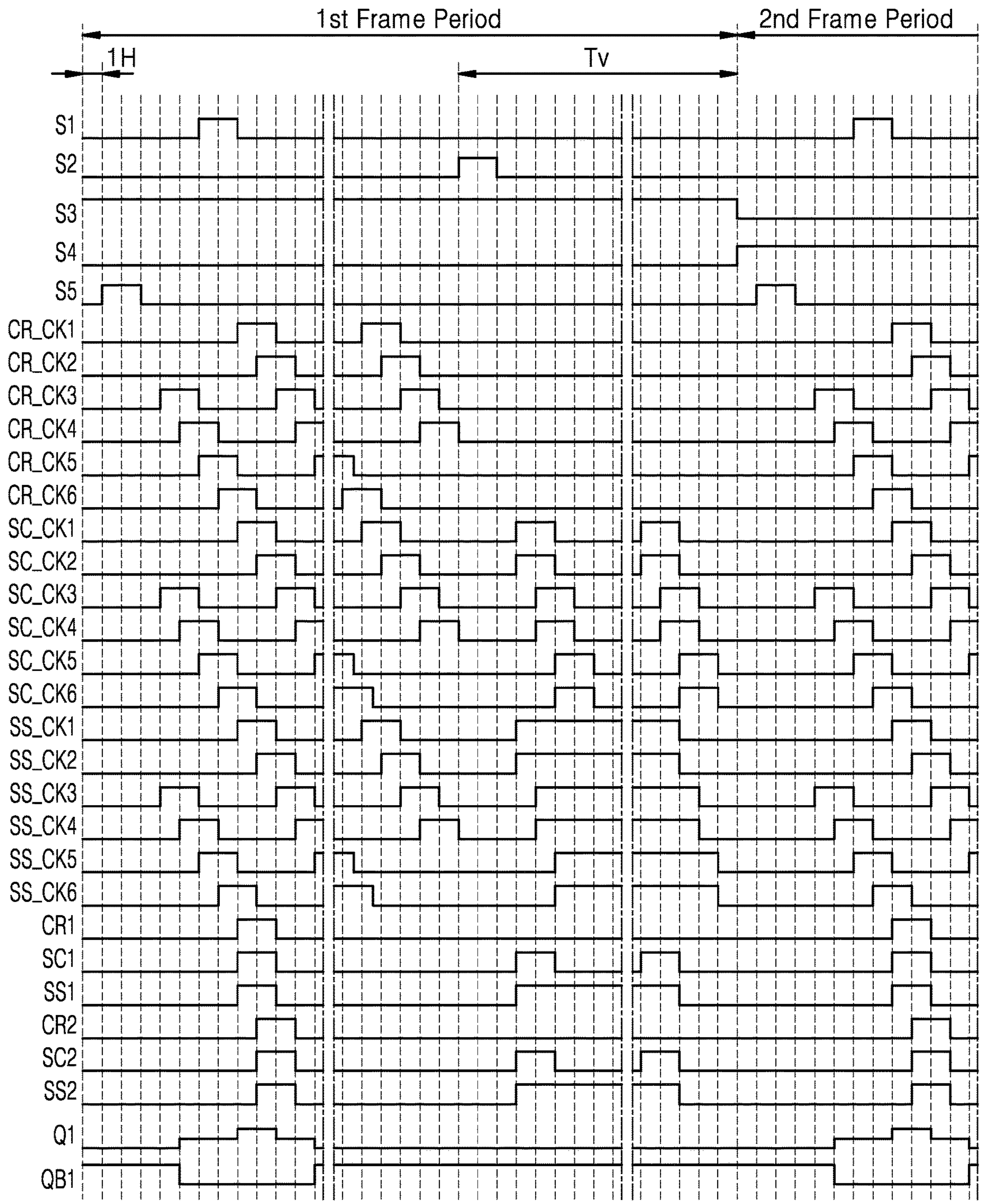
FIGS. 8A and 8B are respectively timing diagrams illustrating a driving method of the selection driving circuit and the first stage illustrated in FIG. 7.
Figure 8B:
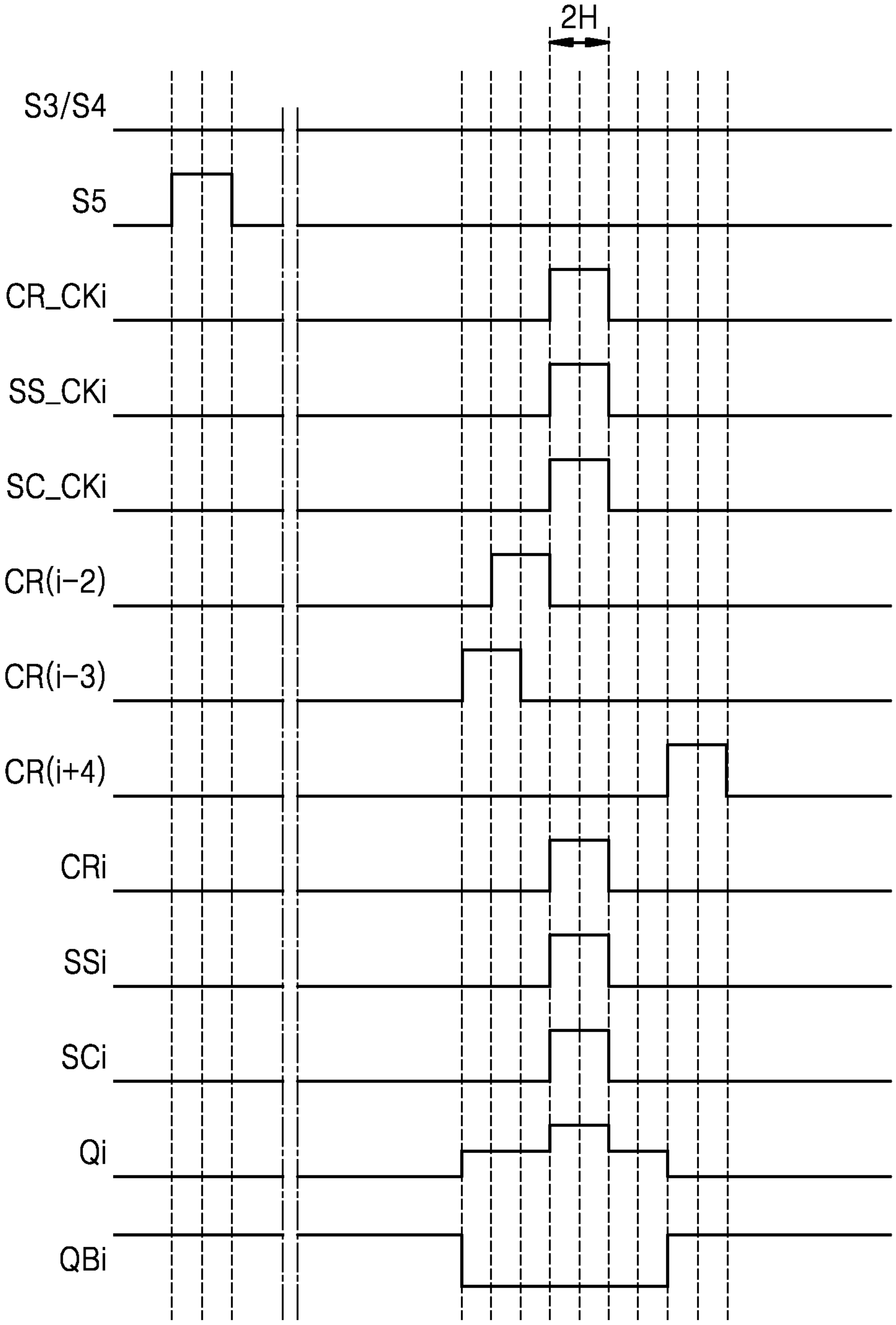
Figure 9:
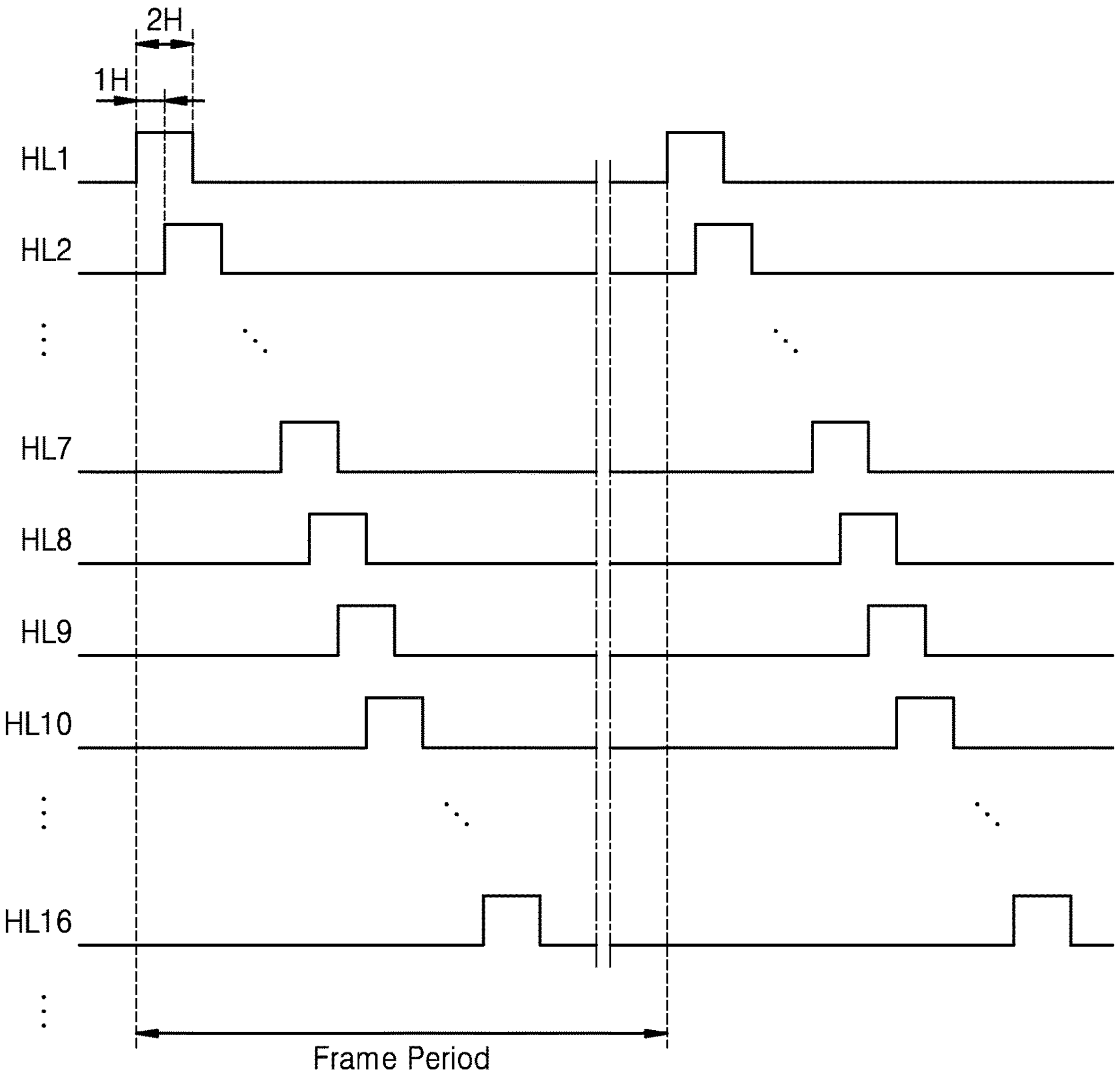
FIG. 9 illustrates output timing of a first scan signal output by driving of the selection driving circuit and the first stage of FIG. 7.

FIGS. 8A and 8B are respectively timing diagrams illustrating a driving method of the selection driving circuit and the first stage illustrated in FIG. 7. FIG. 9 illustrates output timing of a first scan signal output by driving of the selection driving circuit and the first stage of FIG. 7.

In FIG. 8A, the first to fifth control signals S1 to S5, the first carry clock signals CR_CK1 to CR_CK6, the first control clock signals SC_CK1 to SC_CK6, and the second control clock signals SS_CK1 to SS_CK6 are illustrated. Also, in FIG. 8A, first scan signals SC1 and SC2, second scan signals SS1 and SS2, and first carry signals CR1 and CR2 output by the first first stage ST1 and the second first stage ST2, and voltages of the first control node Q and the second control node QB of the first first stage ST1 are illustrated.

The first control signal S1, the second control signal S2, and the fifth control signal S5 may be applied as a high-level voltage (high voltage) for about two horizontal periods 2H. The third control signal S3 may be applied as a high voltage or a low-level voltage (low voltage) in one frame. The fourth control signal S4 may be an inverted signal of the third control signal S3. Each of the first carry clock signals CR_CK1 to CR_CK6, the first control clock signals SC_CK1 to SC_CK6, and the second control clock signals SS_CK1 to SS_CK6 may be applied as a high voltage for 2 horizontal periods 2H at a period of 6 horizontal periods 6H, and may be sequentially output with the phase shifted by one horizontal period 1H.

Hereinafter, an operation of the (i)th first stage STi will be described with reference to FIGS. 8A and 8B, and this may also be similarly applied to the operations of the other first stages. A case where the third control signal S3 or the fourth control signal S4 is supplied as a high voltage will be described as an example.

In FIG. 8B, the first carry clock signal CR_CKi may be a corresponding one of the six first carry clock signals CR_CK1 to CR_CK6, the first control clock signal SC_CKi may be a corresponding one of the six first control clock signals SC_CK1 to SC_CK6, and the second control clock signal SS_CKi may be a corresponding one of the six second control clock signals SS_CK1 to SS_CK6. For example, referring to FIG. 8A, in the first first stage ST1, the first carry clock signal CR_CKi may be the first carry clock signal CR_CK1 among the six first carry clock signals CR_CK1 to CR_CK6, the first control clock signal SC_CKi may be the first control clock signal SC_CK1 among the six first control clock signals SC_CK1 to SC_CK6, and the second control clock signal SS_CKi may be the second control clock signal SS_CK1 among the six second control clock signals SS_CK1 to SS_CK6. In this case, the timing of the (i−2)th first carry signal CR(i−2) may correspond to the timing of the first carry clock signal CR_CK5, the first control clock signal SC_CK5, and the second control clock signal SS_CK5. The timing of the (i−3)th first carry signal CR(i−3) may correspond to the timing of the first carry clock signal CR_CK4, the first control clock signal SC_CK4, and the second control clock signal SS_CK4. The timing of the (i+4)th first carry signal CR(i+4) may correspond to the timing of the first carry clock signal CR_CK5, the first control clock signal SC_CK5, and the second control clock signal SS_CK5.

Referring to FIGS. 8A and 8B, when the fifth control signal S5, which is a start signal, is supplied to the first stage ST1 in the display period Td, the (1-1)th transistor T1-1A and the 1-2 transistor T1-2A may be turned on. When the (1-1)th transistor T1-1A and the (1-2)th transistor T1-2A are turned on, the first control node Q may be set to a low voltage of the second voltage VSS1.

In this case, the third control signal S3 or the fourth control signal S4 may be supplied as a high voltage, and thus, the fifteenth transistor and the eighteenth transistor T18A may be turned on and the voltage of the second control node QB may be set to a high voltage of the third control signal S3. Accordingly, the voltage of the first and second output nodes N6 and N7 may be set to the fourth voltage VSS3, and the voltage of the third output node N8 may be set to the second voltage VSS1. When the second control node QB is set to a high voltage, the (5-1)th transistor T5-1A and the (5-2)th transistor T5-2A may be turned on and thus the first control node Q may be maintained at a low voltage of the second voltage VSS1.

Thereafter, when the (i−3)th first carry signal CR(i−3) is supplied to the first stage STi and the (4-1)th and (4-2)th transistors T4-1A and T4-2A are turned, a high voltage of the (i−3)th first carry signal CR(i−3) may be supplied to the first control node Q and thus the first control node Q may be precharged.

Subsequently, the first carry clock signal CR_CKi, the first control clock signal SC_CKi, and the second control clock signal SS_CKi may be supplied to the first stage STi. In this case, the voltage of the first control node Q may be set to a high voltage higher than the voltage for precharging by coupling of the first to third capacitors CA1, CA2, and CA3.

While the first control node Q is set to a high voltage, because the twelfth transistor T12A, the ninth transistor T9A, and the sixth transistor T6A are turned on, the first carry signal CRi, the second scan signal SSi, and the first scan signal SCi may be respectively output through the third output terminal, the second output terminal, and the first output terminal for two horizontal periods 2H.

Thereafter, as the (i+4)th first carry signal CR(i+4) is supplied to the first stage STi, the (2-1)th transistor T2-1A and the (2-2)th transistor T2-2A may be turned on. When the (2-1)th transistor T2-1A and the (2-2)th transistor T2-2A are turned on, the first control node Q may be discharged to a low voltage of the second voltage VSS1.

Referring to FIG. 9, the first stage STi may output the first scan signal SCi as an ON voltage for “a” horizontal periods (a: a natural number greater than or equal to 1). For example, the first stage STi may output the first scan signal SCi as an ON voltage for two horizontal periods H2. In the display period Td of one frame (see FIG. 3B), from the first first stage ST1 of the first row HL1 to the (n)th first stage STn of the (n)th row HLn, the first scan signal SCi may be shifted by one horizontal period 1H and may be sequentially output.

Likewise, the first stage STi may output the second scan signal SSi as an ON voltage for “a” horizontal periods (a: a natural number greater than or equal to 1). For example, the first stage STi may output the second scan signal SSi as an ON voltage for two horizontal periods H2. In the display period Td of one frame (see FIG. 3B), from the first first stage ST1 of the first row HL1 to the (n)th first stage STn of the (n)th row HLn, the second scan signal SSi may be shifted by one horizontal period 1H and may be sequentially output.

Moreover, in the display period Td, the (i−2)th first carry signal CR(i−2) and the first control signal S1 may be supplied to the selection driving circuit SLC. As the first control signal S1 is supplied, the twenty-first transistor T21A and the twenty-third transistor T23A may be turned on. When the twenty-first transistor T21A and the twenty-third transistor T23A are turned on, a high-level voltage (high voltage) of the (i−2)th first carry signal CR(i−2) may be supplied to the fourth node N4. When the high voltage is supplied to the fourth node N4, the twenty-second transistor T22A, the twenty-fourth transistor T24A, and the twenty-seventh transistor T27A may be turned on.

When the twenty-second transistor T22A is turned on, a high voltage of the first voltage VDD may be supplied to the third node N3 and thus the high voltage of the third node N3 may be stably maintained. When the twenty-fourth transistor T24 is turned on, a high voltage of the first voltage VDD may be supplied to the first node N1. In this case, the fourth capacitor C4 may store the high voltage of the fourth node N4. When the twenty-seventh transistor T27A is turned on, a low voltage of the second voltage VSS1 may be supplied to the second node N2.

In the vertical blank period Tv, the second control signal S2 may be supplied to the selection driving circuit SLC, and the twenty-fifth transistor T25A and the twenty-sixth transistor T26A may be turned on. Accordingly, the first node N1 and the first control node Q may be connected to each other and thus the first control node Q may be set to a high voltage, and the second node N2 and the second control node QB may be connected to each other and thus the second control node QB may be set to a low voltage. In this case, the first control clock signals SC_CK1 to SC_CK6 and the second control clock signals SS_CK1 to SS_CK6 may be supplied, and thus the first scan signal SCi and the second scan signal SSi corresponding thereto may be respectively output through the first output terminal and the second output terminal. Accordingly, the second transistor T2 and the third transistor T3 of the pixel P may be turned on to sense the mobility of the first transistor T1.

Figure 10:
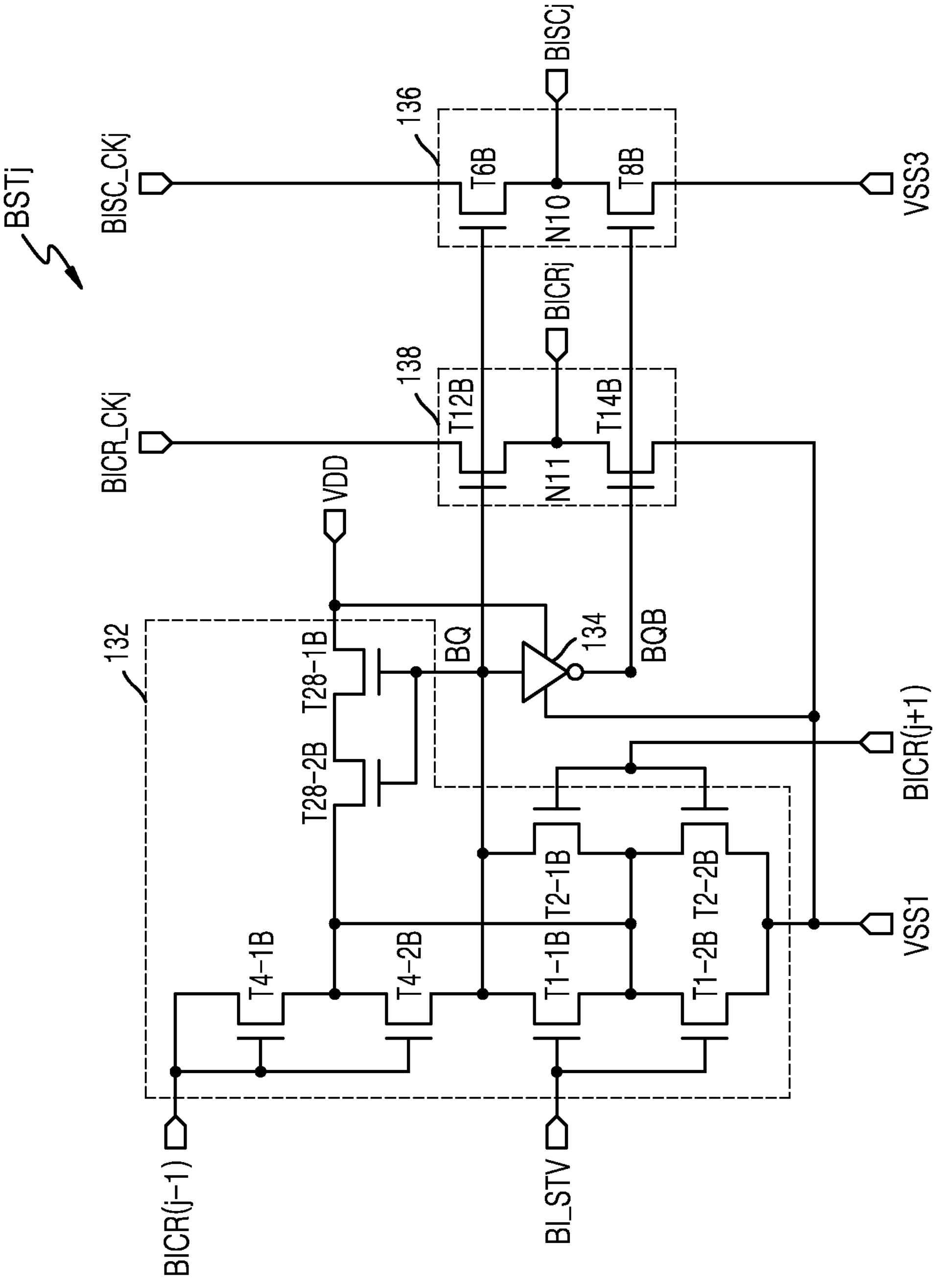
FIG. 10 is a diagram schematically illustrating a portion of a second stage according to an embodiment.

FIG. 10 is a diagram schematically illustrating a portion of a second stage according to an embodiment. FIG. 10 illustrates the (j)th second stage BSTj.

The second stage BSTj may include a second node controller 132, a second inverter 134, a fourth output controller 136, and a fifth output controller 138.

The second node controller 132 may be connected between the input terminal of the first voltage VDD and the input terminal of the second voltage VSS1. The second node controller 132 may set the voltage of the first control node BQ to a high voltage or a low voltage according to the (j−1)th second carry signal BICR(j−1), the (j+1)th second carry signal BICR(j+1), and the second start signal BI_STV. The (j−1)th second carry signal BICR(j−1) may be a signal for precharging the first control node BQ. The (j+1)th second carry signal BICR(j+1) may be a signal for discharging the first control node BQ. The second node controller 132 may include a first transistor, a second transistor, a fourth transistor, and a twenty-eighth transistor.

The first transistor may include a (1-1)th transistor T1-1B and a (1-2)th transistor T1-2B connected in series between the first control node BQ and the input terminal of the second voltage VSS1. Gate electrodes of the (1-1)th transistor T1-1B and the (1-2)th transistor T1-2B may be connected to an input terminal of the fifth control signal S5. When the fifth control signal S5 is supplied, the (1-1)th transistor T1-1B and the (1-2)th transistor T1-2B may be turned on to set the voltage of the first control node BQ to the second voltage VSS1.

The second transistor may include a (2-1)th transistor T2-1B and a (2-2)th transistor T2-2B connected in series between the first control node BQ and the input terminal of the second voltage VSS1. Gate electrodes of the (2-1)th transistor T2-1B and the (2-2)th transistor T2-2B may be connected to an input terminal of the (j+1)th second carry signal BICR(j+1). When the (i+1)th second carry signal BICR(j+1) is supplied, the (2-1)th transistor T2-1B and the (2-2)th transistor T2-2B may be turned on to set the voltage of the first control node BQ to the second voltage VSS1. The (j+1)th second carry signal BICR(j+1) may be the carry signal output by the second stage BST(j+1) that is one-next to the second stage BSTj.

The fourth transistor may include a (4-1)th transistor T4-1B and a (4-2)th transistor T4-2B connected in series between the first control node BQ and an input terminal of the (j−1)th second carry signal BICR(j−1). Gate electrodes of the (4-1)th transistor T4-1B and the (4-2)th transistor T4-2B may be connected to the input terminal of the (j−1)th second carry signal BICR(j−1). When the (j−1)th second carry signal BICR(j−1) is supplied, the (4-1)th transistor T4-1B and the (4-2)th transistor T4-2B may be turned on to supply the (j−1)th second carry signal BICR(j−1) to the first control node BQ. The (j−1)th second carry signal BICR(j−1) may be the carry signal output by the second stage BST(j−1) that is one-previous to the second stage BSTj.

Moreover, the second start signal BI_STV may be input to the input terminal of the (j−1)th second carry signal BICR(j−1) of the dummy stage, the second carry signal output by the previous dummy stage may be input to the input terminal of the (j−1)th second carry signal BICR(j−1) of the first second stage BST1, and the second carry signal of the previous second stage may be input to the input terminal of the (j−1)th second carry signal BICR(j−1) from the second second stage BST2.

The twenty-eighth transistor may include a (28-1)th transistor T28-1B and a (28-2)th transistor T28-2B connected in series between the input terminal of the first voltage VDD and a common electrode of the (4-1)th transistor T4-1B and the (4-2)th transistor T4-2B. Gate electrodes of the (28-1)th transistor T28-1B and the (28-2)th transistor T28-2B may be connected to the first control node BQ. The (28-1)th transistor T28-1B and the (28-2)th transistor T28-2B may be turned on or off in response to the voltage of the first control node BQ. Also, the twenty-eighth transistor may be connected in series to the input terminal of the first voltage VDD, an intermediate node (common electrode) between the (1-1)th transistor T1-1B and the (1-2)th transistor T1-2B, and an intermediate node (common electrode) between the (2-1)th transistor T2-1B and the (2-2)th transistor T2-2B.

That is, the first control node BQ may be set (precharged) to a high voltage by the (j−1)th second carry signal BICR (j−1) and may be set (discharged) to a low voltage by the (j+1)th second carry signal BICR(j+1).

The second inverter 134 may be connected between the first control node BQ and the second control node BQB. The second inverter 134 may be driven by the first voltage VDD and may invert the voltage of the first control node BQ and supply the inverted voltage to the second control node BQB. The second inverter 134 may include at least one transistor, and a detailed structure thereof will be described below with reference to FIG. 11.

The fourth output controller 136 may output a third control clock signal BISC_CKj or the fourth voltage VSS3 to a fourth output terminal connected to the fourth output node N10 according to the voltage of the first control node BQ and the second control node BQB. The fourth output controller 136 may include a sixth transistor T6B and an eighth transistor T8B connected between an input terminal of the third control clock signal BISC_CKj and an input terminal of the fourth voltage VSS3.

The sixth transistor T6B may be connected between the input terminal of the third control clock signal BISC_CKj and the fourth output terminal A gate electrode of the sixth transistor T6B may be connected to the first control node BQ. The sixth transistor T6B may be turned on or off in response to the voltage of the first control node BQ. When the first control node BQ is set to a high voltage, the sixth transistor T6B may be turned on to output the third control clock signal BISC_CKj as a high voltage of a third scan signal BISCj.

The eighth transistor T8B may be connected between the fourth output terminal and the input terminal of the fourth voltage VSS3. A gate electrode of the eighth transistor T8B may be connected to the second control node BQB. The eighth transistor T8B may be turned on or off in response to the voltage of the second control node BQB. When the second control node BQB is set to a high voltage, the eighth transistor T8B may be turned on to output the fourth voltage VSS3 as a low voltage of the third scan signal BISCj.

The fifth output controller 138 may output a second carry clock signal BICR_CKj or the second voltage VSS1 to a fifth output terminal connected to the fifth output node N11 according to the voltage of the first control node BQ and the second control node BQB. The fifth output controller 138 may include a twelfth transistor T12B and a fourteenth transistor T14B connected between an input terminal of the second carry clock signal BICR_CKj and the input terminal of the second voltage VSS1.

The twelfth transistor T12B may be connected between the input terminal of the second carry clock signal BICR_CKj and the fifth output terminal. A gate electrode of the twelfth transistor T12B may be connected to the first control node BQ. The twelfth transistor T12B may be turned on or off in response to the voltage of the first control node BQ. When the first control node BQ is set to a high voltage, the twelfth transistor T12B may be turned on to output the second carry clock signal BICR_CKj as a high voltage of a second carry signal BICRj.

The fourteenth transistor T14B may be connected between the fifth output terminal and the input terminal of the second voltage VSS1. A gate electrode of the fourteenth transistor T14B may be connected to the second control node BQB. The fourteenth transistor T14B may be turned on or off in response to the voltage of the second control node BQB. When the first control node BQ is set to a high voltage, the fourteenth transistor T14B may be turned on to output the second voltage VSS1 as a low voltage of the second carry signal BICRj.

Figure 11:
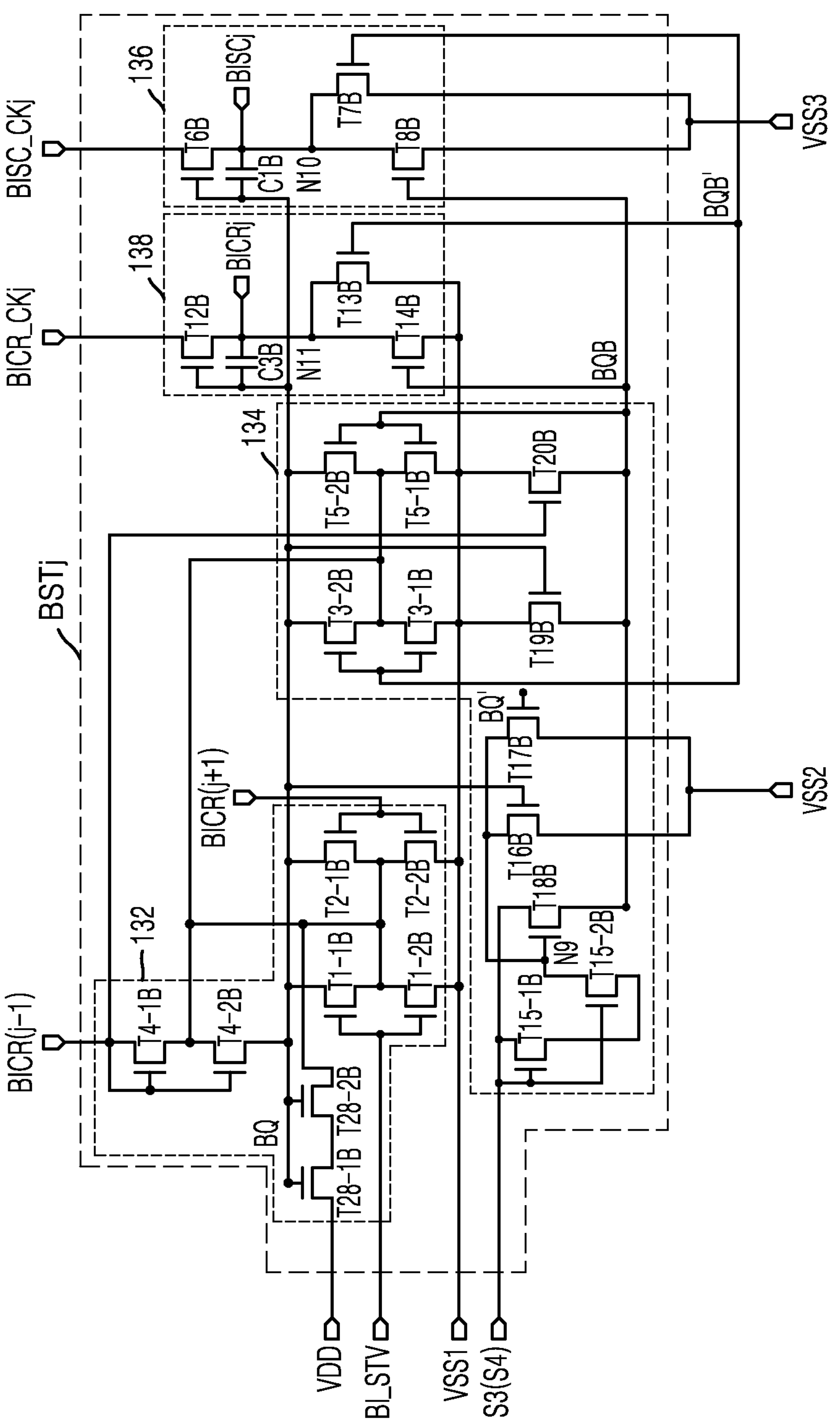
FIG. 11 is a circuit diagram illustrating in more detail the second stage illustrated in FIG. 10.

FIG. 11 is a circuit diagram illustrating in more detail the second stage illustrated in FIG. 10. Hereinafter, redundant descriptions already given above with reference to FIG. 10 will be omitted for conciseness.

Referring to FIG. 11, the second stage BSTj may include a second node controller 132, a second inverter 134, a fourth output controller 136, and a fifth output controller 138.

The second node controller 132 may include a first transistor, a second transistor, a fourth transistor, and a twenty-eighth transistor. The first transistor may include a (1-1)th transistor T1-1B and a (1-2)th transistor T1-2B. The second transistor may include a (2-1)th transistor T2-1B and a (2-2)th transistor T2-2B. The fourth transistor may include a (4-1)th transistor T4-1B and a (4-2)th transistor T4-2B. The twenty-eighth transistor may include a (28-1)th transistor T28-1B and a (28-2)th transistor T28-2B.

The second inverter 134 may set the second control node BQB to a low voltage while the first control node BQ is at a high voltage, and may set the second control node BQB to a high voltage while the first control node BQ is at a low voltage. The second inverter 134 may include a third transistor, a fifth transistor, a fifteenth transistor, and sixteenth to twentieth transistors T16B to T20B.

The third transistor T3B may include a (3-1)th transistor T3-1B and a (3-2)th transistor T3-2B connected in series between the first control node BQ and the input terminal of the second voltage VSS1. Gate electrodes of the (3-1)th transistor T3-1B and the (3-2)th transistor T3-2B may be connected to a second control node BQB' of a next second stage BSTj+1. The (3-1)th transistor T3-1B and the (3-2)th transistor T3-2B may be turned on or off in response to the voltage of the second control node BQB' of the next second stage BSTj+1. When the second control node BQB' of the next second stage BSTj+1 is set to a high voltage, the (3-1)th transistor T3-1B and the (3-2)th transistor T3-2B may be turned on to supply the second voltage VSS1 to the first control node B Q.

The fifth transistor may include a (5-1)th transistor T5-1B and a (5-2)th transistor T5-2B connected in series between the first control node BQ and the input terminal of the second voltage VSS1. Gate electrodes of the (5-1)th transistor T5-1B and the (5-2)th transistor T5-2B may be connected to the second control node BQB. The (5-1)th transistor T5-1B and the (5-2)th transistor T5-2B may be turned on or off in response to the voltage of the second control node BQB. When the second control node BQB is set to a high voltage, the (5-1)th transistor T5-1B and the (5-2)th transistor T5-2B may be turned on to supply the second voltage VSS1 to the first control node BQ.

An intermediate node (common electrode) between the (3-1)th transistor T3-1B and the (3-2)th transistor T3-2B, an intermediate node (common electrode) between the (5-1)th transistor T5-1B and the (5-2)th transistor T5-2B, an intermediate node (common electrode) between the (1-1)th transistor T1-1B and the (1-2)th transistor T1-2B, an intermediate node (common electrode) between the (2-1)th transistor T2-1B and the (2-2)th transistor T2-2B, and an intermediate node (common electrode) between the (4-1)th transistor T4-1B and the (4-2)th transistor T4-2B may be connected to each other and may be supplied with the first voltage VDD when the twenty-eighth transistor is turned on.

The fifteenth transistor may include a (15-1)th transistor T15-1B and a (15-2)th transistor T15-2B connected in series between the input terminal of the third control signal S3 and a gate electrode (i.e., the ninth node N9) of the eighteenth transistor T18B. Gate electrodes of the (15-1)th transistor T15-1B and the (15-2)th transistor T15-2B may be connected to the input terminal of the third control signal S3. When the third control signal S3 is supplied, the (15-1)th transistor T15-1B and the (15-2)th transistor T15-2B may be connected in the form of a diode to supply the third control signal S3 to the ninth node N9.

The sixteenth transistor T16B may be connected between the ninth node N9 and the input terminal of the third voltage VSS2. A gate electrode of the sixteenth transistor T16B may be connected to the first control node BQ. When the first control node BQ is set to a high voltage, the sixteenth transistor T16B may be turned on to supply the third voltage VSS2 to the ninth node N9.

The seventeenth transistor T17B may be connected between the ninth node N9 and the input terminal of the third voltage VSS2. A gate electrode of the seventeenth transistor T17B may be connected to a first control node BQ' of the next second stage BSTj+1. The seventeenth transistor T17B may be turned on or off in response to the voltage of the first control node BQ' of the next second stage BSTj+1. When the first control node BQ' of the next second stage BSTj+1 is set to a high voltage, the seventeenth transistor T17B may be turned on to supply the third voltage VSS2 to the ninth node N9.

The eighteenth transistor T18B may be connected between the input terminal of the third control signal S3 and the second control node BQB. A gate electrode of the eighteenth transistor T18B may be connected to the ninth node N9. The eighteenth transistor T18B may be turned on or off in response to the voltage of the ninth node N9. As the eighteenth transistor T18B is turned on, the voltage of the third control signal S3 may be supplied to the second control node BQB.

The nineteenth transistor T19B may be connected between the second control node BQB and the input terminal of the second voltage VSS1. A gate electrode of the nineteenth transistor T19B may be connected to the first control node BQ. When a high voltage is supplied to the first control node BQ, the nineteenth transistor T19B may be turned on to set the voltage of the second control node BQB to the second voltage VSS1.

The twentieth transistor T20B may be connected between the second control node BQB and the input terminal of the second voltage VSS1. A gate electrode of the twentieth transistor T20B may be connected to the input terminal of the (j−3)th second carry signal BICR(j−3). When the (j−3)th second carry signal BICR(j−3) is supplied, the twentieth transistor T20B may be turned on to set the voltage of the second control node BQB to the second voltage VSS1.

The fourth output controller 136 may include a sixth transistor T6B and an eighth transistor T8B. The fourth output controller 136 may further include a seventh transistor T7B and a first capacitor C1B.

The seventh transistor T7B may be connected between the fourth output node N10 and the input terminal of the fourth voltage VSS3. A gate electrode of the seventh transistor T7B may be connected to a second control node BQB' of the next second stage. When the second control node BQB' of the next second stage is set to a high voltage, the seventh transistor T7B may be turned on to set the voltage of the fourth output node N10 to the fourth voltage VSS3.

The fourth output controller 136 may set the voltage of the fourth output node N10 to the fourth voltage VSS3 by the eighth transistor T8B when the high-level third control signal S3 or the fourth control signal S4 is input, and may set the voltage of the fourth output node N10 to the fourth voltage VSS3 by the seventh transistor T7B when the low-level third control signal S3 or the fourth control signal S4 is input.

The first capacitor C1B may be connected between the fourth output node N10 and the first control node BQ. When the first control node BQ is charged to a high voltage, the sixth transistor T6B may be turned on and thus the third control clock signal BISC_CKj may be output as a high voltage of the third scan signal BISCj, and in this case, the voltage of the first control node BQ may be bootstrapped by the first capacitor C1B.

The fifth output controller 138 may include a twelfth transistor T12B and a fourteenth transistor T14B. The fifth output controller 138 may further include a thirteenth transistor T13B and a third capacitor C3B.

The thirteenth transistor T13B may be connected between the fifth output node N11 and the input terminal of the second voltage VSS1. A gate electrode of the thirteenth transistor T13B may be connected to a second control node BQB' of the next second stage BSTj+1. When the second control node BQB' of the next second stage BSTj+1 is set to a high voltage, the thirteenth transistor T13B may be turned on to set the voltage of the fifth output node N11 to the second voltage VSS1.

The fifth output controller 138 may set the voltage of the fifth output node N11 to the second voltage VSS1 by the fourteenth transistor T14B when the high-level third control signal S3 or the fourth control signal S4 is input, and may set the voltage of the fifth output node N11 to the second voltage VSS1 by the thirteenth transistor T13B when the low-level third control signal S3 or the fourth control signal S4 is input.

The third capacitor C3B may be connected between the fifth output node N11 and the first control node BQ. When the first control node BQ is charged to a high voltage, the twelfth transistor T12B may be turned on and thus the second carry clock signal BICR_CKj may be output as a high voltage of the second carry signal BICRj, and in this case, the voltage of the first control node BQ may be bootstrapped by the third capacitor C3B.

The first control node BQ may be increased by the capacitance ratio of the first and third capacitors C1B and C3B, and thus the signals output from the fourth and fifth output nodes N10 and N11 may be fully swung.

Figure 12A:
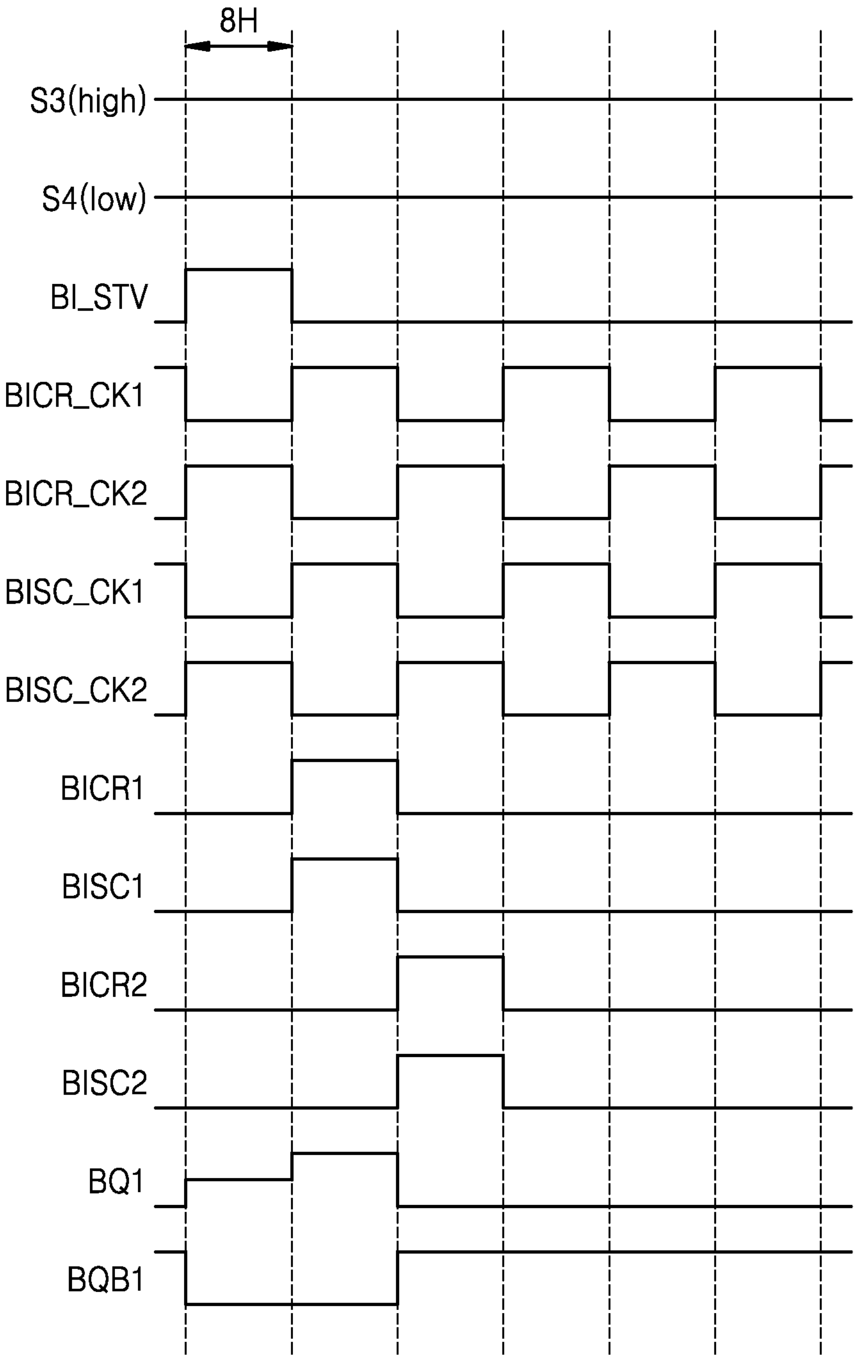
FIGS. 12A and 12B are respectively timing diagrams illustrating a driving method of the second stage illustrated in FIG. 11.
Figure 12B:
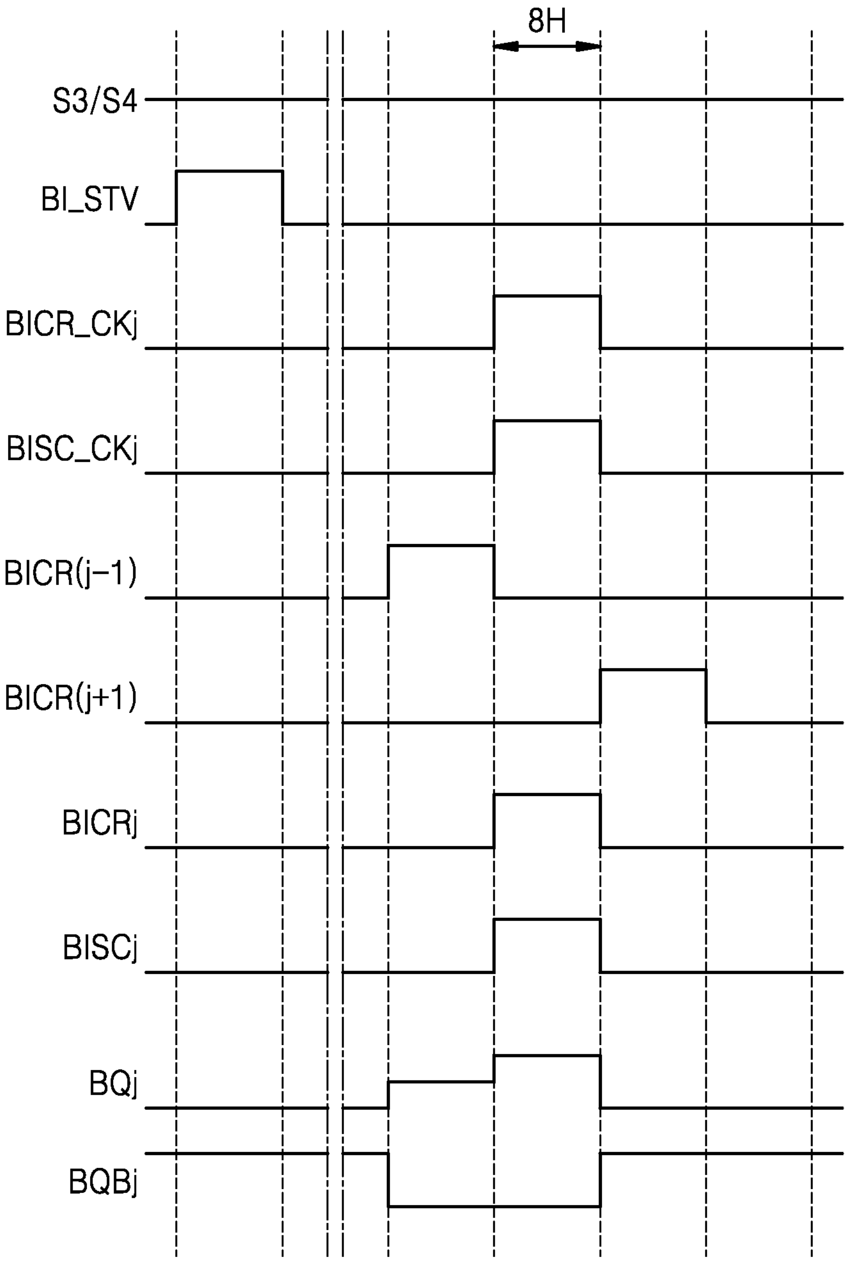
Figure 13:
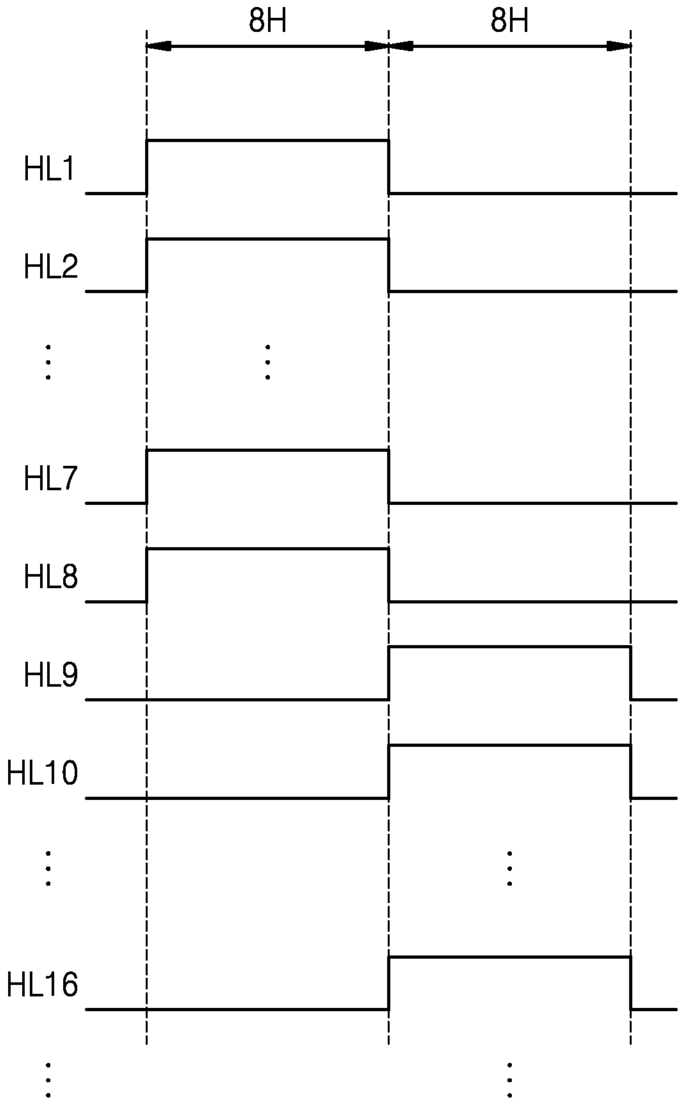
FIG. 13 illustrates output timing of a third scan signal output by driving of the second stage illustrated in FIG. 11.

FIGS. 12A and 12B are respectively timing diagrams illustrating a driving method of the second stage illustrated in FIG. 11. FIG. 13 illustrates output timing of a third scan signal output by driving of the second stage illustrated in FIG. 11. FIGS. 12A and 12B illustrate a partial section of one frame.

In FIG. 12A, the second start signal BI_STV, the third control signal S3, the fourth control signal S4, the second carry clock signals BICR_CK1 and BICR_CK2, and the third control clock signals BISC_CK1 and BISC_CK2 supplied in the black insertion period Tb are illustrated. Also, in FIG. 12A, third scan signals BISC1 and BISC2 and second carry signals BICR1 and BICR2 output by the first second stage BST1 and the second second stage BST2, and voltages of the first control node BQ1 and the second control node BQB1 of the first first stage ST1 are illustrated.

Some of the signals applied to the second stage BSTj may share the signal applied to the first stage STi. For example, as described with reference to FIG. 8A, the third control signal S3 may be applied as a high voltage or a low-level voltage (low voltage) in one frame. The fourth control signal S4 may be an inverted signal of the third control signal S3.

The second start signal BI_STV may be applied as a high-level voltage (high voltage) for 8 horizontal periods 8H. Each of the second carry clock signals BICR_CK1 and BICR_CK2 and the third control clock signals BISC_CK1 and BISC_CK2 may be applied as a high voltage for 8 horizontal periods 8H at a period of 8 horizontal periods 8H, and may be sequentially output with the phase shifted by 8 horizontal periods 8H.

Hereinafter, an operation of the (j)th second stage BSTj will be described with reference to FIGS. 12A and 12B, and this may also be similarly applied to the operations of the other second stages. A case where the third control signal S3 or the fourth control signal S4 is supplied as a high voltage will be described as an example.

In FIG. 12B, the second carry clock signal BICR_CKj may be a corresponding one of the two second carry clock signals BICR_CK1 and BICR_CK2, and the third control clock signal BISC_CKj may be a corresponding one of the two third control clock signals BISC_CK1 and BISC_CK2. For example, referring to FIG. 12A, in the first first stage ST1, the second carry clock signal BICR_CKj may be the second carry clock signal BICR_CK1 among the two second carry clock signals BICR_CK1 and BICR_CK2, and the third control clock signal BISC_CKj may be the third control clock signal BISC_CK1 among the two third control clock signals BISC_CK1 and BISC_CK2. In this case, the timing of the (j−1)th second carry signal BICR(j−1) and the (j+1)th second carry signal BICR(j+1) may correspond to the timing of the second carry clock signal BICR_CK2 and the third control clock signal BISC_CK2.

Referring to FIGS. 12A and 12B, when the second start signal BI_STV is supplied to the second stage BSTj in the black insertion period Tb, the (1-1)th transistor T1-1B and the (1-2)th transistor T1-2B may be turned on. When the (1-1)th transistor T1-1B and the (1-2)th transistor T1-2B are turned on, the first control node BQ may be set to a low voltage of the second voltage VSS1.

In this case, because the third control signal S3 or the fourth control signal S4 is supplied as a high voltage, the fifteenth transistor and the eighteenth transistor T18A may be turned on and the voltage of the second control node BQB may be set to a high voltage of the third control signal S3. Accordingly, the voltage of the fourth output node N10 may be set to the fourth voltage VSS3, and the voltage of the fifth output node N11 may be set to the second voltage VSS1. When the second control node BQB is set to a high voltage, the (5-1)th transistor T5-1B and the (5-2)th transistor T5-2B may be turned on and thus the first control node BQ may be maintained at a low voltage of the second voltage VSS1.

Thereafter, when the (j−1)th second carry signal BICR (j−1) is supplied to the second stage BSTj and the (4-1)th and (4-2)th transistors T4-1B and T4-2B are turned on, a high voltage of the (j−1)th second carry signal BICR(j−1) may be supplied to the first control node BQ and thus the first control node BQ may be precharged.

Subsequently, the second carry clock signal BICR_CKj and the third control clock signal BISC_CKj may be supplied to the second stage BSTj. In this case, the voltage of the first control node BQ may be set to a high voltage higher than the voltage for precharging by coupling of the first and third capacitors CB1 and CB3.

While the first control node BQ is set to a high voltage, because the twelfth transistor T12B and the sixth transistor T6B are turned on, the second carry signal BICRj and the third scan signal BISCj may be respectively output through the fifth output terminal and the fourth output terminal for 8 horizontal periods 8H.

Thereafter, as the (j+1)th second carry signal BICR(j+1) is supplied to the second stage BSTj, the (2-1)th transistor T2-1B and the (2-2)th transistor T2-2B may be turned on. When the (2-1)th transistor T2-1B and the (2-2)th transistor T2-2B are turned on, the first control node BQ may be discharged to a low voltage of the second voltage VSS1.

Referring to FIG. 13, the second stage BSTj may output the third scan signal BISCj as an ON voltage for “b” horizontal periods (b: a multiple of 2). For example, the second stage BSTj may output the third scan signal BISCj as an ON voltage for 8 horizontal periods 8H. In the black insertion period Tb of one frame (see FIG. 3B), from the first second stage BST1 to the last second stage BSTn/8, the third scan signal BISCj may be shifted by 8 horizontal periods 8H and sequentially output, wherein each of the second stages may simultaneously output the third scan signal BISCj to eight rows.

In the above embodiments, the first scan signal and the second scan signal for image display may be shifted by one horizontal period and sequentially output, and the third scan signal for black data insertion may be shifted by 8 horizontal periods and sequentially output and may be output to a plurality of rows simultaneously. However, the present embodiments are not limited thereto. In other embodiments, the first scan signal and the second scan signal for image display may be shifted by one horizontal period and sequentially output, and the third scan signal for black data insertion may be shifted by 2's multiple horizontal periods and sequentially output and may be output to a plurality of rows simultaneously. For example, the third scan signal may be shifted by 2 horizontal periods, 4 horizontal periods, 6 horizontal periods, 12 horizontal periods, or 16 horizontal periods and sequentially output and may be output to a plurality of rows simultaneously.

According to the present embodiments, a driving circuit for generating the first scan signal SCi and the second scan signal SSi for image display in the display period Td and a driving circuit for generating the third scan signal BISCj for black data insertion in the black insertion period Tb may be separately provided and independently driven, and the output timings of the first start signal STV and the second start signal BI_STV may be differently set. Accordingly, the on-voltage time (the time in which the on-voltage is maintained) of the scan signal may be sufficiently secured, and thus, the MPRT characteristics may be improved, the emission duty may be randomly set, and the long-term reliability of the driving circuits may be secured.

According to the present embodiments, because a driving circuit for writing black data and a driving circuit for writing image data may be provided in the ratio of 2:1, 4:1, 8:1, 12:1, 16:1, or the like, the dead space loss due to addition of driving circuits may be minimized.

Also, according to the present embodiments, a certain voltage capable of displaying black in the display apparatus may be used as the black voltage Vb. Accordingly, because it may be unnecessary to supply black data through the data line, the power consumption and heat generation of the data driving circuit may be improved. Also, when one of the voltages used to drive the pixel, for example, the common voltage ELVSS, the initialization voltage VINT, or the like, is used as the black voltage Vb, a configuration for generating additional power may be reduced.

In the drawings, the rising timing and the falling timing are illustrated as overlapping each other between the signals; however, this is merely for convenience of illustration and the rising timing and the falling timing may not overlapping each other between the signals.

According to an embodiment, because a driving circuit for inserting black data into a pixel in a frame period is provided independently from a driving circuit for displaying an image, a scan time for writing image data and a scan time for writing black data may be sufficiently secured and thus a motion picture response rate may be improved.

The effects of the disclosure are not limited to the above effects and may be variously extended without departing from the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A scan driver comprising:

a plurality of stages output first scan signals in a first period in a frame period and second scan signals in a second period in the frame period, wherein the plurality of stages sequentially output the first scan signals to first scan lines in the first period in the frame period in response to a first start signal, and sequentially output the second scan signals to second scan lines in the second period in the frame period in response to a second start signal, and wherein each of the second scan signals is provided to at least two second scan lines in the second period.

2. The scan driver of claim 1, wherein an applying timing of the second start signal to the scan driver is different from an applying timing of the first start signal to the scan driver.

3. The scan driver of claim 1, wherein a duty of the first scan signal is different from a duty of the second scan signal.

4. The scan driver of claim 1, wherein the first scan signals are sequentially outputted by being shifted by one horizontal period (H), and the second scan signals are sequentially outputted by being shifted by bH, where b is a multiple of 2.

5. The scan driver of claim 1, wherein the second scan signals are sequentially outputted for a multiple of at least two horizontal periods.

6. The scan driver of claim 1, wherein the plurality of stages comprises:

a plurality of first stages sequentially outputting the first scan signals; and a plurality of second stages sequentially outputting the second scan signals.

7. The scan driver of claim 6, wherein each of the first stages comprises:

a first node controller connected between an input terminal of a first voltage and an input terminal of a second voltage lower than the first voltage and controlling a voltage of a first control node and a voltage of a second control node based on a previous first carry signal and a control signal;

a first output controller outputting a first control clock signal as the first scan signal based on the voltage of the first control node; and a second output controller outputting a first carry clock signal as a first carry signal based on the voltage of the first control node.

8. The scan driver of claim 7, wherein the first node controller comprises:

a pair of first transistors connected between the input terminal of the second voltage and the first control node and comprising a gate electrode connected to an input terminal of a fifth control signal;

a pair of second transistors connected between the input terminal of the second voltage and the first control node and comprising a gate electrode connected to an input terminal of a next first carry signal;

a pair of fourth transistors connected between an input terminal of the previous first carry signal and the first control node and comprising a gate electrode connected to the input terminal of the previous first carry signal; and a pair of twenty-eighth transistors connected between the input terminal of the first voltage and an intermediate node between the fourth transistors and comprising a gate electrode connected to the first control node, wherein the fifth control signal is the first start signal.

9. The scan driver of claim 7, wherein the first output controller comprises:

a sixth transistor connected between a first output node connected to a first output terminal for outputting the first scan signal and an input terminal of the first control clock signal and comprising a gate electrode connected to the first control node;

an eighth transistor connected between the first output node and an input terminal of a fourth voltage lower than the second voltage and comprising a gate electrode connected to the second control node; and a first capacitor connected between the first control node and the first output node.

10. The scan driver of claim 7, wherein the second output controller comprises:

a twelfth transistor connected between a third output node connected to a third output terminal for outputting the first carry signal and an input terminal of the first carry clock signal and comprising a gate electrode connected to the first control node;

a fourteenth transistor connected between the third output node and the input terminal of the second voltage and comprising a gate electrode connected to the second control node; and a third capacitor connected between the first control node and the third output node.

11. The scan driver of claim 7, wherein each of the first stages further comprises a first inverter connected between the first control node and the second control node, inverting a voltage level of the voltage of the first control node, and supplying a voltage having the inverted voltage level to the second control node.

12. The scan driver of claim 11, wherein the first inverter comprises:

a pair of third transistors connected between the first control node and the input terminal of the second voltage and comprising a gate electrode connected to a second control node of a next first stage;

a pair of fifth transistors connected between the first control node and the input terminal of the second voltage and comprising a gate electrode connected to the second control node;

a sixteenth transistor connected between an input terminal of a third control signal and an input terminal of a third voltage lower than the second voltage and comprising a gate electrode connected to the first control node;

a seventeenth transistor connected between the input terminal of the third control signal and the input terminal of the third voltage and comprising a gate electrode connected to the first control node of the next first stage;

an eighteenth transistor connected between the input terminal of the third control signal and the second control node;

a fifteenth transistor connected between the input terminal of the third control signal and a gate electrode of the eighteenth transistor and comprising a gate electrode connected to the input terminal of the third control signal;

a nineteenth transistor connected between the input terminal of the second voltage and the second control node and comprising a gate electrode connected to the first control node; and a twentieth transistor connected between the input terminal of the second voltage and the second control node and comprising a gate electrode connected to an input terminal of the previous first carry signal.

13. The scan driver of claim 7, wherein the first stages sequentially output third scan signals to the third scan lines in the first period in the frame period; and wherein each of the first stages further comprises a third output controller outputting a second control clock signal as the third scan signal based on the voltage of the first control node.

14. The scan driver of claim 13, wherein the third output controller comprises:

a ninth transistor connected between a second output node connected to a second output terminal for outputting the third scan signal and an input terminal of the second control clock signal and comprising a gate electrode connected to the first control node;

an eleventh transistor connected between the second output node and an input terminal of a fourth voltage lower than the second voltage and comprising a gate electrode connected to the second control node; and a second capacitor connected between the first control node and the second output node.

15. The scan driver of claim 6, wherein each of the second stages comprises:

a second node controller connected between an input terminal of a first voltage and an input terminal of a second voltage lower than the first voltage and controlling a voltage of a third control node and a voltage of a fourth control node based on a previous second carry signal and a control signal;

a fourth output controller outputting a third control clock signal as the second scan signal based on the voltage of the third control node; and a fifth output controller outputting a second carry clock signal as a second carry signal based on the voltage of the third control node.

16. The scan driver of claim 15, wherein the second node controller comprises:

a pair of first transistors connected between the input terminal of the second voltage and the third control node and comprising a gate electrode connected to an input terminal of the second start signal;

a pair of second transistors connected between the input terminal of the second voltage and the third control node and comprising a gate electrode connected to an input terminal of a next second carry signal;

a pair of fourth transistors connected between an input terminal of the previous second carry signal and the third control node and comprising a gate electrode connected to the input terminal of the previous second carry signal; and a pair of twenty-eighth transistors connected between the input terminal of the first voltage and an intermediate node between the fourth transistors and comprising a gate electrode connected to the third control node.

17. The scan driver of claim 15, wherein the fifth output controller comprises:

a twelfth transistor connected between a fifth output node connected to a fifth output terminal for outputting the second carry signal and an input terminal of the second carry clock signal and comprising a gate electrode connected to the third control node;

a fourteenth transistor connected between the fifth output node and the input terminal of the second voltage and comprising a gate electrode connected to the fourth control node; and a fifth capacitor connected between the third control node and the fifth output node.

18. The scan driver of claim 15, wherein the fourth output controller comprises:

a sixth transistor connected between a fourth output node connected to a fourth output terminal for outputting the second scan signal and an input terminal of the third control clock signal and comprising a gate electrode connected to the third control node;

an eighth transistor connected between the fourth output node and an input terminal of a fourth voltage lower than the second voltage and comprising a gate electrode connected to the fourth control node; and a fourth capacitor connected between the third control node and the fourth output node.

19. The scan driver of claim 15, wherein each of the second stages further comprises a second inverter connected between the third control node and the fourth control node and inverting a voltage level of the voltage of the third control node and supplying a voltage having the inverted voltage level to the fourth control node.

20. The scan driver of claim 19, wherein the second inverter comprises:

a pair of third transistors connected between the third control node and the input terminal of the second voltage and comprising a gate electrode connected to a fourth control node of a next second stage;

a pair of fifth transistors connected between the third control node and the input terminal of the second voltage and comprising a gate electrode connected to the fourth control node;

a sixteenth transistor connected between an input terminal of a third control signal and an input terminal of a third voltage lower than the second voltage and comprising a gate electrode connected to the third control node;

a seventeenth transistor connected between the input terminal of the third control signal and the input terminal of the third voltage and comprising a gate electrode connected to a third control node of the next second stage;

an eighteenth transistor connected between the input terminal of the third control signal and the fourth control node;

a fifteenth transistor connected between the input terminal of the third control signal and a gate electrode of the eighteenth transistor and comprising a gate electrode connected to the input terminal of the third control signal;

a nineteenth transistor connected between the input terminal of the second voltage and the fourth control node and comprising a gate electrode connected to the third control node; and a twentieth transistor connected between the input terminal of the second voltage and the fourth control node and comprising a gate electrode connected to an input terminal of the previous second carry signal.

21. A scan driver comprising:

a plurality of stages output first scan signals in a first period in a frame period and second scan signals in a second period in the frame period, wherein the plurality of stages sequentially output the first scan signals to first scan lines in the first period in the frame period in response to a first start signal, and sequentially output the second scan signals to second scan lines in the second period in the frame period in response to a second start signal, and wherein a duration of the second scan signals is at least two horizontal periods, wherein a duty of the first scan signal in the first period is different from a duty of the second scan signal in the second period, wherein the first scan signals are sequentially outputted by being shifted by one horizontal period (H), and wherein the second scan signals are sequentially outputted by being shifted by bH, where b is a multiple of 2.

* * * * *